US 9,942,739 B2

(12) United States Patent
Bozik et al.

(10) Patent No.: US 9,942,739 B2
(45) Date of Patent: Apr. 10, 2018

(54) METHOD AND SYSTEM FOR EMERGENCY CALL MANAGEMENT

(71) Applicant: RAPIDSOS, INC., New York, NY (US)

(72) Inventors: Matthew Bozik, Rockport, IN (US); Nicholas Horelik, Northborough, MA (US); Michael J. Martin, Cambridge, MA (US); Anil Mehta, Wailuku, HI (US)

(73) Assignee: RAPIDSOS, INC., New York, NY (US)

( * ) Notice: Subject to any disclaimer, the term of this patent is extended or adjusted under 35 U.S.C. 154(b) by 0 days.

(21) Appl. No.: 14/856,818

(22) Filed: Sep. 17, 2015

(65) Prior Publication Data

US 2016/0088455 A1    Mar. 24, 2016

Related U.S. Application Data

(60) Provisional application No. 62/052,606, filed on Sep. 19, 2014.

(51) Int. Cl.
*H04W 4/22*     (2009.01)
*H04W 4/02*     (2018.01)
(Continued)

(52) U.S. Cl.
CPC ........... *H04W 4/22* (2013.01); *H04L 12/1895* (2013.01); *H04L 41/0654* (2013.01);
(Continued)

(58) Field of Classification Search
CPC . H04M 3/5116; H04M 3/493; H04L 12/1895; H04W 4/21; H04W 4/22; H04W 4/025; H04W 72/007; H04W 64/003
See application file for complete search history.

(56) References Cited

U.S. PATENT DOCUMENTS 5,379,337 A    1/1995    Castillo et al.
5,479,482 A    12/1995   Grimes
(Continued)

FOREIGN PATENT DOCUMENTS

CA    2662606 A1    10/2009
CA    2697986 A1    9/2010
(Continued)

OTHER PUBLICATIONS

Notification of Transmittal of the International Search Report and the Written Opinion of the International Searching Authority from corresponding International Application No. PCT/US2015/050609 dated Dec. 16, 2015.
(Continued)

*Primary Examiner* — Hassan Kizou
*Assistant Examiner* — Roberta A Shand
(74) *Attorney, Agent, or Firm* — Wilson Sonsini Goodrich & Rosati

(57) ABSTRACT

A system and method for generating and transmitting emergency messages and for maintaining real-time emergency communications sessions between users and emergency dispatch centers. A system receives data transmitted from a user device and constructs an emergency message related to a specific type of emergency scenario as well as the location, meta-data and background information of the user. The generated emergency message is transmitted via a communications network and delivered to an appropriate emergency dispatch center. The method enables the user to deliver a detailed request for help regardless of his or her location or, in another instance, delivers the basic emergency response related information for the user. The generated emergency message is universally compatible with emergency communications center infrastructure so long as the communications centers possess basic voice call equipment.

21 Claims, 16 Drawing Sheets

(51) Int. Cl.

| | | |
|---|---|---|
| *H04L 12/58* | (2006.01) | |
| *H04W 4/14* | (2009.01) | |
| *H04W 76/00* | (2018.01) | |
| *H04L 12/24* | (2006.01) | |
| *H04M 7/00* | (2006.01) | |
| *H04L 12/18* | (2006.01) | |
| *H04M 3/493* | (2006.01) | |
| *H04M 3/51* | (2006.01) | |
| *H04W 76/02* | (2009.01) | |

(52) U.S. Cl.
CPC ............ *H04L 51/04* (2013.01); *H04M 3/493* (2013.01); *H04M 3/5116* (2013.01); *H04M 7/006* (2013.01); *H04W 4/02* (2013.01); *H04W 4/14* (2013.01); *H04W 76/007* (2013.01); *H04W 76/028* (2013.01); *H04L 51/02* (2013.01)

(56) References Cited

U.S. PATENT DOCUMENTS

| | | | |
|---|---|---|---|
| 5,563,931 | A | 10/1996 | Bishop et al. |
| 5,596,625 | A | 1/1997 | Leblanc |
| 5,710,803 | A | 1/1998 | Kowal et al. |
| 5,742,666 | A * | 4/1998 | Alpert ............ H04M 1/274575 340/426.2 |
| 6,014,555 | A | 1/2000 | Tendler |
| 6,249,674 | B1 | 6/2001 | Verdonk |
| 6,252,943 | B1 * | 6/2001 | Johnson ............ H04M 3/4228 379/219 |
| 6,477,362 | B1 | 11/2002 | Raith et al. |
| 6,502,030 | B2 * | 12/2002 | Hilleary ............ B60R 25/33 340/992 |
| 6,510,315 | B1 | 1/2003 | Arnson |
| 6,556,816 | B1 | 4/2003 | Gafrick et al. |
| 6,571,092 | B2 | 5/2003 | Faccin et al. |
| 6,594,666 | B1 * | 7/2003 | Biswas ............ G06F 17/3087 |
| 6,600,812 | B1 | 7/2003 | Gentillin et al. |
| 6,628,933 | B1 | 9/2003 | Humes |
| 7,058,385 | B2 | 6/2006 | Lauper |
| 7,224,773 | B2 | 5/2007 | Croak et al. |
| 7,324,801 | B2 | 1/2008 | Droste et al. |
| 7,349,706 | B2 | 3/2008 | Kim et al. |
| 7,409,044 | B2 | 8/2008 | Leduc |
| 7,436,938 | B2 | 10/2008 | Savaglio et al. |
| 7,437,143 | B1 | 10/2008 | Williams |
| 7,469,138 | B2 | 12/2008 | Dayar et al. |
| 7,483,519 | B2 | 1/2009 | Binning |
| 7,519,351 | B2 | 4/2009 | Malone, III |
| 7,519,372 | B2 | 4/2009 | MacDonald et al. |
| 7,548,158 | B2 | 6/2009 | Titus et al. |
| 7,565,131 | B2 | 7/2009 | Rollender |
| 7,646,854 | B2 * | 1/2010 | Anderson ............ H04W 4/22 379/37 |
| 7,676,215 | B2 | 3/2010 | Chin et al. |
| 7,684,782 | B2 | 3/2010 | Ashley, Jr. et al. |
| 7,848,733 | B2 | 12/2010 | Bull et al. |
| 7,949,326 | B2 | 5/2011 | Gallagher et al. |
| 8,009,810 | B2 | 8/2011 | Seidberg et al. |
| 8,041,335 | B2 | 10/2011 | Khetawat et al. |
| 8,041,341 | B1 | 10/2011 | Malackowski et al. |
| 8,045,954 | B2 | 10/2011 | Barbeau et al. |
| 8,102,972 | B2 | 1/2012 | Poremba |
| 8,126,424 | B2 | 2/2012 | Piett et al. |
| 8,150,367 | B1 | 4/2012 | Malladi et al. |
| 8,165,560 | B2 | 4/2012 | Stenquist |
| 8,165,562 | B2 | 4/2012 | Piett et al. |
| 8,185,087 | B2 | 5/2012 | Mitchell, Jr. et al. |
| 8,195,121 | B2 | 6/2012 | Dunn et al. |
| 8,219,135 | B2 | 7/2012 | De Amorim et al. |
| 8,244,205 | B2 | 8/2012 | Wu |
| 8,249,546 | B1 | 8/2012 | Shah et al. |
| 8,249,547 | B1 | 8/2012 | Fellner |
| 8,289,953 | B2 | 10/2012 | Ray et al. |
| 8,306,501 | B2 | 11/2012 | Moodbidri et al. |
| 8,326,260 | B1 | 12/2012 | Bradish et al. |
| 8,369,488 | B2 | 2/2013 | Sennett et al. |
| 8,401,565 | B2 | 3/2013 | Sandberg et al. |
| 8,417,212 | B2 | 4/2013 | Cepuran et al. |
| 8,472,973 | B2 | 6/2013 | Lin et al. |
| 8,484,352 | B2 | 7/2013 | Piett et al. |
| 8,489,062 | B2 | 7/2013 | Ray et al. |
| 8,509,729 | B2 | 8/2013 | Shaw |
| 8,516,122 | B2 | 8/2013 | Piett et al. |
| 8,538,370 | B2 | 9/2013 | Ray et al. |
| 8,538,468 | B2 | 9/2013 | Daly |
| 8,594,015 | B2 | 11/2013 | Dunn et al. |
| 8,606,218 | B2 | 12/2013 | Ray et al. |
| 8,625,578 | B2 | 1/2014 | Roy et al. |
| 8,626,112 | B2 | 1/2014 | Ray et al. |
| 8,630,609 | B2 | 1/2014 | Ray et al. |
| 8,644,301 | B2 | 2/2014 | Tamhankar et al. |
| 8,682,279 | B2 | 3/2014 | Rudolf et al. |
| 8,682,281 | B2 | 3/2014 | Dunn et al. |
| 8,682,286 | B2 | 3/2014 | Dickinson et al. |
| 8,712,366 | B2 | 4/2014 | Greene et al. |
| 8,747,336 | B2 | 6/2014 | Tran |
| 8,751,265 | B2 | 6/2014 | Piett et al. |
| 8,760,290 | B2 | 6/2014 | Piett et al. |
| 8,811,935 | B2 | 8/2014 | Faccin et al. |
| 8,825,687 | B2 | 9/2014 | Marceau et al. |
| 8,848,877 | B2 | 9/2014 | Seidberg et al. |
| 8,866,606 | B1 | 10/2014 | Will et al. |
| 8,868,028 | B1 | 10/2014 | Kaltsukis |
| 8,880,021 | B2 | 11/2014 | Hawkins |
| 8,890,685 | B1 | 11/2014 | Sookman et al. |
| 8,971,839 | B2 | 3/2015 | Hong |
| 8,984,143 | B2 | 3/2015 | Serra et al. |
| 9,008,078 | B2 | 4/2015 | Kamdar et al. |
| 9,019,870 | B2 | 4/2015 | Khan et al. |
| 9,071,643 | B2 | 6/2015 | Saito et al. |
| 9,077,676 | B2 | 7/2015 | Price et al. |
| 9,078,092 | B2 | 7/2015 | Piett et al. |
| 9,094,816 | B2 | 7/2015 | Maier et al. |
| 9,167,379 | B1 | 10/2015 | Hamilton et al. |
| 9,244,922 | B2 | 1/2016 | Marceau et al. |
| 9,258,680 | B2 | 2/2016 | Drucker |
| 9,277,389 | B2 | 3/2016 | Saito et al. |
| 9,351,142 | B2 | 5/2016 | Basore et al. |
| 9,369,847 | B2 | 6/2016 | Borghei |
| 9,402,159 | B1 | 7/2016 | Self et al. |
| 9,503,876 | B2 | 11/2016 | Saito et al. |
| 9,544,750 | B1 | 1/2017 | Self et al. |
| 9,591,467 | B2 | 3/2017 | Piett et al. |
| 9,635,534 | B2 | 4/2017 | Maier et al. |
| 9,693,213 | B2 | 6/2017 | Self et al. |
| 9,805,430 | B2 | 10/2017 | Miasnik et al. |
| 2002/0001367 | A1 | 1/2002 | Lee |
| 2002/0057678 | A1 | 5/2002 | Jiang et al. |
| 2002/0120698 | A1 | 8/2002 | Tamargo |
| 2003/0069035 | A1 | 4/2003 | Shurvinton |
| 2004/0203572 | A1 | 10/2004 | Aerrabotu et al. |
| 2004/0266390 | A1 | 12/2004 | Faucher et al. |
| 2005/0085215 | A1 | 4/2005 | Kokko et al. |
| 2005/0104745 | A1 | 5/2005 | Bachelder et al. |
| 2005/0151642 | A1 | 7/2005 | Tupler et al. |
| 2006/0293024 | A1 | 12/2006 | Benco et al. |
| 2007/0030144 | A1 | 2/2007 | Titus et al. |
| 2007/0033095 | A1 | 2/2007 | Hodgin et al. |
| 2007/0049287 | A1 | 3/2007 | Dunn |
| 2007/0053308 | A1 | 3/2007 | Dumas et al. |
| 2007/0058528 | A1 | 3/2007 | Massa et al. |
| 2007/0060097 | A1 | 3/2007 | Edge et al. |
| 2007/0161383 | A1 | 7/2007 | Caci |
| 2007/0218895 | A1 | 9/2007 | Saito et al. |
| 2008/0019268 | A1 | 1/2008 | Rollins |
| 2008/0063153 | A1 | 3/2008 | Krivorot et al. |
| 2008/0081646 | A1 | 4/2008 | Morin et al. |
| 2008/0194238 | A1 | 8/2008 | Kwon |
| 2008/0294058 | A1 | 11/2008 | Shklarski |
| 2009/0257345 | A1 | 10/2009 | King |
| 2009/0322513 | A1 | 12/2009 | Hwang et al. |
| 2010/0002846 | A1 | 1/2010 | Ray et al. |

(56) References Cited

U.S. PATENT DOCUMENTS

| | | |
|---|---|---|
| 2010/0159976 A1 | 6/2010 | Marocchi et al. |
| 2010/0166153 A1 | 7/2010 | Guleria et al. |
| 2010/0202368 A1 | 8/2010 | Hans |
| 2010/0238018 A1 | 9/2010 | Kelly |
| 2011/0009086 A1 | 1/2011 | Poremba et al. |
| 2011/0086607 A1 | 4/2011 | Wang et al. |
| 2011/0103266 A1 | 5/2011 | Andreasen et al. |
| 2011/0134897 A1 | 6/2011 | Montemurro et al. |
| 2011/0153368 A1 | 6/2011 | Pierre et al. |
| 2011/0201357 A1 | 8/2011 | Garrett et al. |
| 2011/0263219 A1 | 10/2011 | Hasenfang et al. |
| 2012/0002792 A1 | 1/2012 | Chang |
| 2012/0029970 A1 | 2/2012 | Stiles et al. |
| 2012/0092161 A1 | 4/2012 | West |
| 2012/0144019 A1 | 6/2012 | Zhu |
| 2012/0202428 A1 | 8/2012 | Mirbaha et al. |
| 2012/0210325 A1 | 8/2012 | De Lind Van Wijngaarden et al. |
| 2012/0218102 A1 | 8/2012 | Bivens et al. |
| 2012/0257729 A1 | 10/2012 | Piett et al. |
| 2012/0289243 A1 | 11/2012 | Tarlow et al. |
| 2012/0295575 A1 | 11/2012 | Nam |
| 2012/0309341 A1 | 12/2012 | Ward |
| 2013/0005295 A1 | 1/2013 | Park et al. |
| 2013/0030825 A1 | 1/2013 | Bagwandeen et al. |
| 2013/0084824 A1 | 4/2013 | Hursey |
| 2013/0122932 A1 | 5/2013 | Patel et al. |
| 2013/0138791 A1 | 5/2013 | Thomas et al. |
| 2013/0183924 A1 | 7/2013 | Saigh et al. |
| 2013/0203373 A1 | 8/2013 | Edge |
| 2013/0203376 A1 | 8/2013 | Maier et al. |
| 2013/0226369 A1 | 8/2013 | Yorio et al. |
| 2013/0237175 A1 | 9/2013 | Piett |
| 2013/0237181 A1 | 9/2013 | Ray |
| 2013/0331055 A1 | 12/2013 | McKown et al. |
| 2014/0051379 A1 | 2/2014 | Ganesh et al. |
| 2014/0086108 A1 | 3/2014 | Dunn et al. |
| 2014/0087680 A1 | 3/2014 | Luukkala et al. |
| 2014/0113606 A1 | 4/2014 | Morken et al. |
| 2014/0126356 A1 | 5/2014 | Lee et al. |
| 2014/0148120 A1 | 5/2014 | Buck |
| 2014/0155018 A1 | 6/2014 | Fan et al. |
| 2014/0199959 A1 | 7/2014 | Hassan et al. |
| 2014/0248848 A1 | 9/2014 | Mufti et al. |
| 2014/0324351 A1 | 10/2014 | Dannevik et al. |
| 2015/0055453 A1 | 2/2015 | Chaki et al. |
| 2015/0081209 A1 | 3/2015 | Yeh et al. |
| 2015/0109125 A1 | 4/2015 | Kaib et al. |
| 2015/0111524 A1 | 4/2015 | South et al. |
| 2015/0137972 A1 | 5/2015 | Nepo et al. |
| 2015/0172897 A1 | 6/2015 | Mariathasan et al. |
| 2015/0289121 A1 | 10/2015 | Lesage et al. |
| 2015/0304827 A1 | 10/2015 | Price et al. |
| 2015/0350262 A1 | 12/2015 | Rainisto et al. |
| 2015/0358794 A1 | 12/2015 | Nokhoudian et al. |
| 2015/0365319 A1 | 12/2015 | Finn et al. |
| 2016/0004224 A1 | 1/2016 | Pi |
| 2016/0026768 A1 | 1/2016 | Singh et al. |
| 2016/0050550 A1 | 2/2016 | Anand et al. |
| 2016/0219084 A1 | 7/2016 | Abiezzi |
| 2016/0219397 A1 | 7/2016 | Mayor et al. |
| 2016/0269535 A1 | 9/2016 | Balabhadruni et al. |
| 2016/0307436 A1 | 10/2016 | Nixon |
| 2016/0337831 A1 | 11/2016 | Piett et al. |
| 2016/0345171 A1 | 11/2016 | Kulkarni et al. |
| 2016/0363931 A1 | 12/2016 | Yang et al. |
| 2017/0004427 A1 | 1/2017 | Bruchal et al. |
| 2017/0140637 A1 | 5/2017 | Thurlow et al. |
| 2017/0142568 A1 | 5/2017 | Saito et al. |
| 2017/0150335 A1 | 5/2017 | Self et al. |
| 2017/0180963 A1 | 6/2017 | Cavendish et al. |
| 2017/0180966 A1 | 6/2017 | Piett et al. |
| 2017/0195475 A1 | 7/2017 | Mehta et al. |
| 2017/0213251 A1 | 7/2017 | Nunally et al. |
| 2017/0238129 A1 | 8/2017 | Maier et al. |
| 2017/0238136 A1 | 8/2017 | Smith |
| 2017/0245113 A1 | 8/2017 | Hooker |
| 2018/0020091 A1 | 1/2018 | Self et al. |

FOREIGN PATENT DOCUMENTS

| | | |
|---|---|---|
| CA | 2773749 A1 | 10/2012 |
| CA | 2773881 A1 | 10/2012 |
| CA | 2790501 A1 | 3/2013 |
| CA | 2809421 A1 | 9/2013 |
| CA | 2646607 C | 9/2016 |
| JP | 2012222443 A | 11/2012 |
| KR | 20090019606 A | 2/2009 |
| KR | 20090092900 A | 9/2009 |
| KR | 20100055746 A | 5/2010 |
| KR | 101305286 B1 | 9/2013 |
| KR | 20140052780 A | 5/2014 |
| KR | 20150097031 A | 8/2015 |
| KR | 101602482 B1 | 3/2016 |
| KR | 20160097933 A | 8/2016 |
| WO | WO-0167419 A2 | 9/2001 |
| WO | WO-2007109599 A3 | 12/2007 |
| WO | WO-2012129561 A1 | 9/2012 |
| WO | WO-2014025563 A1 | 2/2014 |
| WO | 20140074420 A1 | 5/2014 |
| WO | WO-2014074420 A1 | 5/2014 |
| WO | WO-2014176646 A1 | 11/2014 |
| WO | WO-2015127867 A1 | 9/2015 |
| WO | WO-2016044540 A1 | 3/2016 |
| WO | WO-2017079354 A1 | 5/2017 |
| WO | WO-2017100220 A1 | 6/2017 |
| WO | WO-2017106775 A1 | 6/2017 |
| WO | WO-2017112820 A1 | 6/2017 |

OTHER PUBLICATIONS

Co-pending U.S. Appl. No. 15/342,093, filed Nov. 2, 2016.
Co-pending U.S. Appl. No. 15/371,117, filed Dec. 6, 2016.
PCT/US2015/050609 International Search Report and Written Opinion dated Dec. 16, 2015.
U.S. Appl. No. 14/794,780 Office Action dated Feb. 2, 2016.
U.S. Appl. No. 14/794,780 Office Action dated Nov. 15, 2016.
Co-pending U.S. Appl. No. 15/382,097, filed Dec. 16, 2016.
Co-pending U.S. Appl. No. 15/387,363, filed Dec. 21, 2016.
Co-pending U.S. Appl. No. 15/436,379, filed Feb. 17, 2017.
Co-pending U.S. Appl. No. 15/436,484, filed Feb. 17, 2017.
Co-pending U.S. Appl. No. 15/444,133, filed Feb. 27, 2017.
Co-pending U.S. Appl. No. 29/590,709, filed Jan. 12, 2017.
PCT/US2016/060189 International Search Report and Written Opinion dated Feb. 24, 2017.
PCT/US2016/065212 International Search Report and Written Opinion dated Feb. 20, 2017.
U.S. Appl. No. 14/794,780 Office Action dated Mar. 7, 2017.
Co-pending U.S. Appl. No. 15/682,440, filed Aug. 21, 2017.
Co-pending U.S. Appl. No. 15/497,067, filed Apr. 25, 2017.
Co-pending U.S. Appl. No. 15/588,343, filed May 5, 2017.
Co-pending U.S. Appl. No. 15/589,847, filed May 8, 2017.
PCT/US2015/050609 International Preliminary Report on Patentability dated Mar. 30, 2017.
PCT/US2016/067366 International Search Report and Written Opinion dated Mar. 31, 2017.
PCT/US2016/068134 International Search Report and Written Opinion dated Apr. 21, 2017.
Tazaki. Floating Ground: An Architecture for Network Mobility and Ad Hoc Network Convergence. Thesis. Graduate School of Media and Governance Keio University 5322 Endo Fujisawa, Kanagawa, Japan 2520882 (pp. 1-162) (2010).
U.S. Appl. No. 15/387,363 Office Action dated Jul. 6, 2017.
U.S. Appl. No. 15/387,363 Office Action dated Mar. 15, 2017.
U.S. Appl. No. 15/436,379 Office Action dated Apr. 6, 2017.
U.S. Appl. No. 15/436,484 Office Action dated May 8, 2017.
U.S. Appl. No. 15/444,133 Office Action dated Apr. 4, 2017.
U.S. Appl. No. 15/497,067 Office Action dated Jun. 23, 2017.
U.S. Appl. No. 15/589,847 Office Action dated Jun. 23, 2017.
U.S. Appl. No. 15/436,484 Office Action dated Sep. 14, 2017.

(56) References Cited

OTHER PUBLICATIONS

Co-pending U.S. Appl. No. 15/667,531, filed Aug. 2, 2017.
PCT/US2017/029465 International Search Report and Written Opinion dated Aug. 9, 2017.
PCT/US2017/031605 International Search Report and Written Opinion dated Jul. 31, 2017.
U.S. Appl. No. 15/444,133 Office Action dated Aug. 17, 2017.
U.S. Appl. No. 15/436,379 Office Action dated Nov. 2, 2017.
U.S. Appl. No. 15/667,531 Office Action dated Nov. 8, 2017.
PCT/US2017/047854 International Search Report and Written Opinion dated Nov. 28, 2017.
U.S. Appl. No. 15/589,847 Office Action dated Nov. 30, 2017.
Co-pending U.S. Appl. No. 15/880,208, filed Jan. 25, 2018.
National Emergency Number Association (Nena) Technical Committee Chairs: NENA Functional and Interface Standards for Next Generation 9-1-1 Version 1.0 (i3). (Dec. 18, 2017). Retrieved from the Internet: URL:https://c.ymcdn.com/sites/nena.site-ym.com/resource/collection/2851C951-69FF-40F0-A6B8-36A714CB085D/NENA_08-002-vl_Functional_Interface_Standards_NG911_i3.pdf [retrieved on Feb. 5, 2018] (121 pgs).

\* cited by examiner

METHOD AND SYSTEM FOR EMERGENCY CALL MANAGEMENT

CROSS-REFERENCE TO RELATED APPLICATION

This application claims the benefit of priority to U.S. Provisional Patent Application Ser. No. 62/052,606 titled "SYSTEM AND METHOD FOR IMPLEMENTING AND MAINTAINING EMERGENCY COMMUNICATION SESSIONS" filed on Sep. 19, 2014, which is hereby incorporated herein by reference in its entirety for all purposes.

BACKGROUND OF INVENTION

1. Field of Invention

Aspects and embodiments disclosed herein are generally directed to systems and methods for the management of emergency calls, and for the enablement of emergency calls to be placed from mobile communications devices through communication channels other than public switched telephone network or cellular voice calls.

2. Discussion of Related Art

People in emergencies may request help via a designated emergency number, such as a three-digit number like 911 or direct local access telephone numbers (i.e., numbers tied to a specific emergency dispatch center). Increasingly, communications to emergency dispatch centers ("EDCs"), such as Public Safety Answering Points ("PSAPs"), are made via mobile wireless devices and smart devices (e.g., smartphones, tablets, laptops, wearable smart devices, etc.), rather than land-based telephone lines. A majority of PSAPs and EDCs are incapable of receiving non-voice data from these mobile wireless and smart devices. A system and method to facilitate communication of non-voice data to EDCs and PSAPs is needed.

SUMMARY OF INVENTION

Given the varying capabilities of dispatch centers to receive different forms of communications (e.g., voice, SMS, email, etc.), it has been found desirable in accordance with one or more embodiments that mobile devices incorporate a standard platform that is universally compatible with dispatch centers while also offering the ability for users to utilize additional features enabled by mobile and smart devices, such as text messaging, location services, and video capture features to fulfill a request for emergency response.

Historically, a user has not been able to make non-voice network calls, or voice calls over data networks such as those using Internet Protocol (IP), also referred to as Voice of IP (VoIP) calls, to an overwhelming majority of EDCs (fewer than 1% of PSAPs in United States today can accept non-voice and VoIP calls). Accordingly, a user wishing to deliver a text message, video feed, image, or some other non-voice message to an EDC could not be assured that his/her message would be received by the intended recipient. Moreover, in many instances, the user could not even be assured that he/she would receive confirmation of receipt or lack thereof from the EDC, thereby causing the user to remain unsure as to whether his/her request for help was being fulfilled.

A great number of personal communication devices, for example, some tablet and laptop computers, are enabled to send and receive messages over data communication channels, such as the Internet, however, are not configured to send and receive phone calls. These devices also do not have a way for an EDC to call back in case such a need arises in the process of providing emergency response service to the end user. Accordingly it would be desirable to provide a method of provisioning telephone numbers through which non-voice enabled personal communication devices may be called back.

Given the current infrastructure constraints of the vast majority of dispatch centers, it has been found desirable to provide a system and associated method that enables users to utilize more advanced features of today's phones, such as text, location services, video, and images, to deliver voice and non-voice messages to EDCs, regardless of the physical infrastructure constraints of the EDC. It has been found desirable to provide a system to update the caller by receiving updates of whether or not the EDC personnel are able to respond to the request for help and the status of their emergency response. Further, it has been found desirable to provide a method to initialize and manage such communication using a data network such as the Internet as a communication platform.

Various aspects and embodiments disclosed herein include methods and systems which fulfill one or more of these needs.

In accordance with one aspect, there is provided a method of facilitating a reliable and persistent communication between a user of an application client, also referred to herein as a user communication device, and an emergency response dispatch center. The method comprises receiving an emergency alert from the user communication device at an emergency messaging system, constructing an emergency message that is based on the emergency alert and that includes at least one of an audio file, an interactive voice response (IVR) message, a Short Message Service (SMS) text message, a Multimedia Messaging Service (MMS) message, an e-mail message, an Instant Messaging (IM) message, and a message otherwise formatted for communication over the Internet, establishing a first communication link, the first communication link including at least one of a communication link between the emergency messaging system and an emergency response dispatch center, a link between the emergency messaging system and a Routing Service Provider (RSP) and a communication link between the RSP and the dispatch center, and a communication link between the emergency response dispatch center and a first gateway and a communication link between the first gateway and the emergency messaging system, establishing a second communication link, the second communication link including at least one of a communication link between the emergency messaging system and the user communication device, and a communication link between the emergency messaging system and a second gateway and between the second gateway and the user communication device, bridging the first communication link and the second communication link, routing the emergency message from the emergency messaging system to the dispatch center over the first communications link, and actively managing the first and second communication links until a termination signal is received from the user communication device.

In some embodiments the user communication device contains an application client, implemented in software, to generate and transmit an emergency alert as well as receive information from EMS information about the emergency alert.

In some embodiments, the method comprises communicating between the user communication device and the dispatch center via text messages.

In some embodiments, the method comprises communicating between the user communication device and the dispatch center via e-mail exchanges.

In some embodiments, the user communication device contains an application client and the user uses the application client to interact with the user communication device.

In some embodiments, constructing the IVR message includes generating an audio message from alert metadata and user information of the user stored in a user database of the emergency messaging system.

In some embodiments, the emergency messaging system sends a push notification to the user communication device notifying the user of an attempted connection with the dispatch center.

In some embodiments, the emergency messaging system sends an SMS message to the user communication device notifying the user of an attempted connection with the dispatch center.

In some embodiments, the emergency messaging system continuously attempts to initiate a voice connection with the dispatch center until success or termination by request by one of the user and a session controller of the emergency messaging system.

In some embodiments, the emergency messaging system maintains the first communication link if the second communication link fails and maintains the second communication link if the first communication link fails. The emergency messaging system may re-establish the first communication link responsive to failure of the first communication link and re-establish the second communication link responsive to failure of the second communication link.

In some embodiments, the emergency messaging system determines whether a reliable data connection to the dispatch center is available, implements a VoIP session between the dispatch center and the user communication device responsive to a determination that a reliable data connection to the dispatch center is available, implements a cellular phone call between the dispatch center and the user communication device responsive to a determination that a reliable data connection to the dispatch center is not available and that a reliable cellular connection between the user communication device and the dispatch center is available, and implements a PSTN phone call between the dispatch center and the user communication device responsive to a determination that a reliable data connection to the dispatch center is not available and that a cellular phone call between the user communication device and the dispatch center failed to initiate and that a PSTN telephone connection is between the user communication device and the dispatch center is available.

In some embodiments, the first communication link includes multiple TCP or UDP sessions and the second communication link includes multiple TCP or UDP sessions.

In some embodiments, the first gateway is configured to generate, transmit, receive and interpret multimedia Session Initiation Protocol (SIP) messages. In some embodiments, the first gateway is configured to generate, transmit, receive and interpret H.323 signaling messages.

In some embodiments, the second gateway is configured to generate, transmit, receive and interpret multimedia Session Initiation Protocol (SIP) messages. In some embodiments, the second gateway is configured to generate, transmit, receive and interpret H.323 signaling messages.

In accordance with another aspect, there is provided a method for providing emergency communication with an emergency messaging system. The method comprises provisioning and maintaining a pool of direct inward dial telephone numbers at one or more gateways, receiving, at a server of the emergency messaging system (EMS) remote from the user communication device, a transmission from the user communication device that indicates that a user of the user communication device is in an emergency, receiving, at the EMS, metadata containing information regarding a location of the user communication device sent from the user communication device, using information regarding the location of the user communication device to determine an Emergency Dispatch Center (EDC) to which to transmit an emergency message, selecting a telephone number from the pool of direct inward dial telephone numbers, associating the telephone number with the user communication device, associating the telephone number with the location of the user communication device in real-time using an emergency service provisioning application programming interface (API), and utilizing the telephone number to provision emergency service for the user from the EDC.

In some embodiments, the emergency messaging system sends location information metadata to one of a number of APIs exposed by third-party Routing Service Providers (RSPs) and, in response to sending the location information metadata, receives, from the one of the number of APIs, an identity of an EDC and identifying information associated with the EDC, including location, infrastructure capabilities, and responder availability of the EDC. The emergency messaging system may include the location information in a request for provisioning of emergency services for the user utilizing the telephone number, and the third-party RSP may update an automatic location identification (ALI) database of the emergency messaging system to associate the location information with the telephone number.

In some embodiments, the emergency messaging system determines if communications between the user communication device and the EDC have been successfully established utilizing the telephone number and a third-party RSP and, responsive to communications between the user communication device and the EDC having not been successfully established, attempts to establish communication between the user communication device and the EDC using a different third-party RSP and associated telephone number. The emergency messaging system may originate a telephone call to the EDC through one of the one or more gateways.

In accordance with another aspect, there is provided an emergency management system (EMS) containing a communications system comprising at least one first input/output (I/O) system configured to receive a request for assistance from a user communication device, the request including metadata providing an indication of a location of the user communication device and a type of emergency reported by a user of the user communication device and at least one processing unit in communication with the at least one first I/O system. The at least one processing unit is configured to receive an indication of the request from the at least one first I/O system and interpret the metadata transmitted from the user communication device, communicate with at least one server of the EMS housing a memory unit including personal information associated with the user via a communications network of the EMS, and read the personal information from the memory unit, generate an emergency message related to an emergency category associated with the type of emergency reported by the user, the emergency message including information associated with the emergency category, an indication of the location of the user communication device, and the personal information of the user, determine, based upon knowledge of the capabilities of a plurality of emergency dispatch centers and based upon the location of the user communication device, an emergency dispatch center that is equipped to receive the alert and whether the emergency dispatch center is configured to receive non-voice calls, responsive to a determination that the emergency dispatch center is configured to receive non-voice calls and to a determination that the emergency message is in a non-voice format, to transmit the emergency message in the non-voice format to the emergency dispatch center, and responsive to a determination that the emergency dispatch center is not configured to receive non-voice calls and to a determination that the emergency message is in a non-voice format, to convert the emergency message to a voice format and transmit the emergency message via a non-IP communication link to the emergency dispatch center.

In some embodiments, the at least one processing unit is further configured to communicate the emergency message to at least one Routing Service Provider (RSP) over a communications network via at least one second I/O system of the EMS. The RSP may be configured to communicate the emergency message to a network address of one of the plurality of emergency dispatch centers based on the emergency category, each of the plurality of emergency dispatch centers being different. The one of the plurality of emergency dispatch centers may be a police station. The one of the plurality of emergency dispatch centers may be a fire house.

In some embodiments, the RSP is configured to communicate the emergency message to a network address of a one of the plurality of emergency dispatch centers selected based on the emergency category and the location of the user communication device. The one of the plurality of emergency dispatch centers may be a university-affiliated emergency dispatch center. The one of the plurality of emergency dispatch centers may be one of a corporate emergency dispatch center and a private emergency dispatch center.

In some embodiments, the user communication device is configured to transmit the request for assistance to the at least one first I/O system in one of text, speech-to-text, voice, and voice-to-text format, based upon a selection made by the user, and the at least one first I/O system is configured to receive and process the request for assistance in any of the text, speech-to-text, voice, and voice-to-text formats.

In some embodiments, the EMS includes an application programming interface (API) configured to create a communications bridge between the user communication device and the emergency dispatch center.

In accordance with another aspect, there is provided a user communications device configured to request emergency assistance from an emergency management system. The user communications device comprises a user interface, a location determination module configured to determine a location of the user communication device, a communications module configured to send and receive messages over a communications network, and a processor. The processor is configured to display a plurality of user-selectable emergency message indicators in the user interface, each of the plurality of user-selectable emergency message indicators indicative of a different type of emergency situation, receive an indication of the location of the user communication device from the location determination module, receive an indication of a selection of one of the user-selectable emergency message indicators by a user, responsive to receiving the indication of the selection, generate a message including an indication of the selected one of the user-selectable emergency message indicators and an indication of the location of the user communication device, transmit the message via the communications module to the emergency management system, establish a communications link to an emergency dispatch center through the emergency management system, and receive a real-time response to the message from the emergency dispatch center via the emergency management system.

In some embodiments, the user interface comprises a touch screen and wherein each user-selectable emergency message indicator comprises a soft-button selectable by touching the touch screen in an area defined by a respective one of the soft-buttons.

In some embodiments, the user communications device is further configured to request a verification of the location of the user communication device from the user and to receive an input from the user one of confirming the location of the user communication device and selecting a location other than the location determined by the location determination module. The indication of the location of the user communication device may be included in the message is the location other than the location determined by the location determination module.

In some embodiments, the user communications device is further configured to present a sub-menu of characterizations of the emergency situation, the sub-menu selected based on the selected one of the user-selectable emergency message indicators, the sub-menu of characterizations including characterizations of the emergency situation that contain more specific information than the type of emergency situation indicated by the selected one of the user-selectable emergency message indicators.

In some embodiments, the user communications device is further configured to include an indication of a characterization of the emergency situation selected from the sub-menu by the user in the message.

In some embodiments, the user communications device is further configured to receive additional information from the user and include the additional information in the message.

In some embodiments, the user communications device is configured to receive the additional information from the user in the form of one of touch, voice, and a gesture.

In some embodiments, the user communications device is configured to receive the additional information from the user in the form of one of an image and a video message.

In some embodiments, the user communications device, comprises a portable electronic device selected from the group consisting of a smart phone, a tablet computer, a laptop computer, and a wearable smart device or other form of Internet enabled portable electronic device.

In some embodiments, the user communications device is configured to receive the response to the message from the emergency dispatch center in any of a text message, an e-mail message, a voice message, an image, and a video message.

In some embodiments, the communications network is a wireless communications network.

In some embodiments, the user communications device is configured to receive a message from the emergency management system re-establishing the communications link between the user communications device and the emergency dispatch center responsive to a failure of the communications link.

In some embodiments, the user communications device is configured to transmit the message over any of a plurality of communication channels, to determine a communications channel among the plurality of communication channels most suitable for the communications link, and to transmit the message over the determined communications channel.

In some embodiments, the user communications device is configured to switch the communications link from a first communications channel to a second communications channel responsive to a command from the emergency management system.

In some embodiments, the user communications device is configured to receive session status updates regarding the communications link from the emergency management system and display the session status updates in the user interface.

In some embodiments, the user communications device is configured to re-transmit the message responsive to not receiving an indication of a successful establishment of the communications link from the emergency management system.

In some embodiments, the user communications device is configured to dial a conventional emergency response number responsive to not receiving an indication of a successful establishment of the communications link from the emergency management system after a pre-determined number of iterations of re-transmitting the message.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
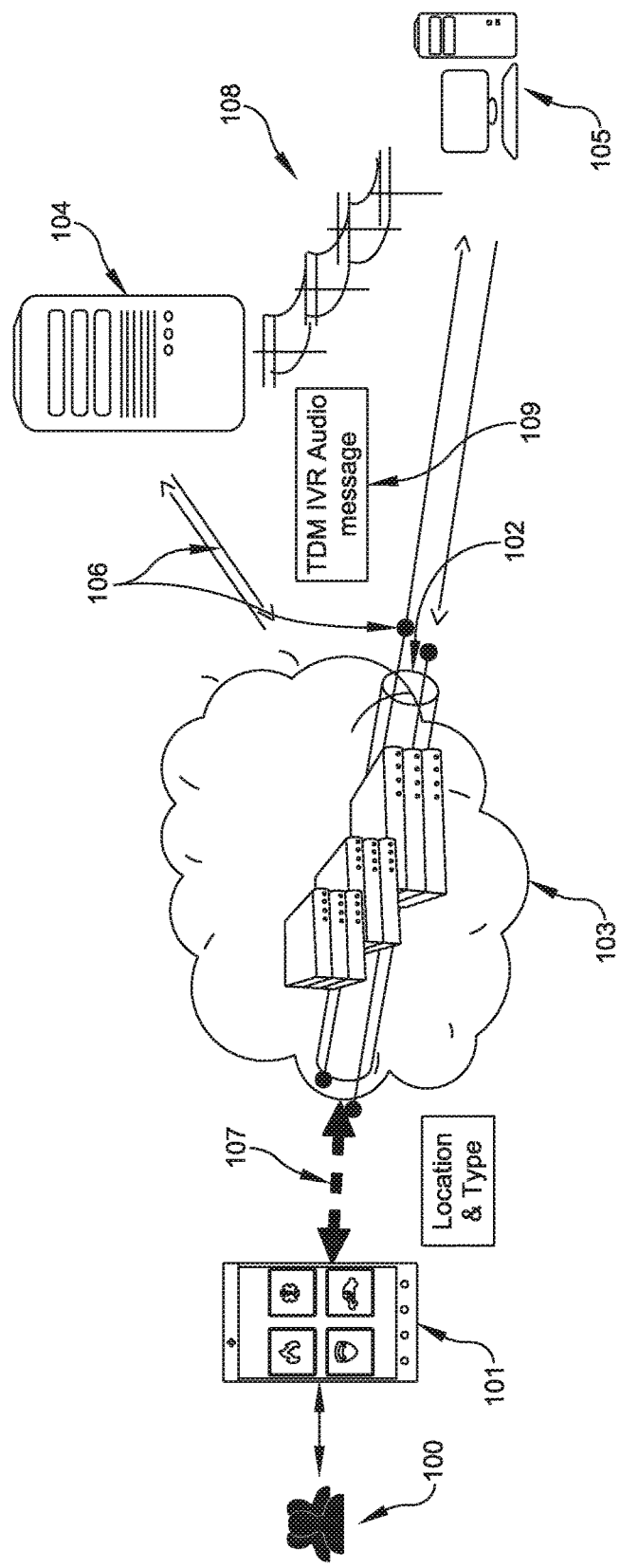
FIG. 1 is an illustration of one embodiment of an environment for generating and communicating a partially pre-formatted emergency voice message to an emergency dispatch center ("EDC")

Aspects and embodiments disclosed herein are not limited to the details of construction and the arrangement of components set forth in the following description or illustrated in the drawings. Aspects and embodiments disclosed herein are capable of being practiced or of being carried out in various ways. Also, the phraseology and terminology used herein is for the purpose of description and should not be regarded as limiting. The use of "including," "comprising," "having," "containing," "involving," and variations thereof herein is meant to encompass the items listed thereafter and equivalents thereof as well as additional items.

Aspects and embodiments disclosed herein provide for a method for initiation and management of emergency call sessions, including use of the many features provided by wireless mobile and smart devices, such as delivery of a multimedia message from a user communication device to an EDC in real-time, routed via at least one of many servers of an emergency management system (EMS) housed in the Internet. Also disclosed herein are aspects and embodiments of a method of provisioning a direct in-ward dial (DID) telephone number (TN) to a user communication device for the purpose of emergency response.

To deliver a message to an emergency dispatch center ("EDC"), such as a Public Safety Answering Point ("PSAP"), an interactive voice message ("IVM") may be generated from metadata including, but not limited to, name, health records, emergency contact persons, geographic location, call-back number, type of emergency and current status of the response received from a user communication device and same or other details stored in servers remote to the user communication device contained within an EMS placed in a computer network. This metadata may be communicated via multiple modes of transmission, including IP and Short Message Services ("SMS" or "text message"), to these remote servers where it may be combined into an audio file with interactive voice response ("IVR") capabilities. The IVM thus generated is then communicated via a communications network to a VoIP gateway, for example, a Session Initiation Protocol (SIP) Trunking device (SIP trunking is the use of voice over IP (VoIP) to facilitate the connection of a private branch exchange (PBX) to the Internet. In effect, the Internet replaces the conventional telephone trunk, allowing an enterprise to communicate with fixed and mobile telephone subscribers. SIP is an Internet Engineering Task Force (IETF) standard for initiating interactive multimedia user sessions; a trunk is a line or link that can carry many signals at once, connecting major switching centers or nodes in a communications system), or a H.323 trunking device (H.323 is signaling and control protocol developed by International Telecommunications Union (ITU) for initiating interactive multimedia user sessions), and subsequently optionally to a routing service provider (RSP) for transmission to a PSAP or other EDC (e.g. university or corporate dispatch center) or transmitted directly to the EDC using a communication network such as the Internet. Aspects and embodiments disclosed herein encompass a system of delivering IVMs to emergency call centers regardless of advance knowledge of a user's location, as the generated audio file is ultimately converted to a traditional voice format, such as via time-division multiplexing ("TDM"), and therefore compatible with any EDC, regardless of the original form of the communication from the user communication device (e.g., SMS, VoIP messages, etc.). Other aspects and embodiments disclosed herein relate to a system of delivering IVMs via IP to those dispatch centers that have been identified as capable of receiving IP-based messages. Still another aspects and embodiments disclosed herein relate to a process of repeating the IVMs either on a periodic basis or on request by the EDC.

Moreover, aspects and embodiments disclosed herein enable the establishment and maintenance of a live session between a user of a mobile communication device and emergency dispatcher at the EDC. This includes the setting up of a communication link between an EMS, which contains one or more computing machines each housing a server, a database or other networked computer, placed in the network and the user communication device, and another communication link between the EMS and the EDC, where each link is initiated and managed by the EMS. In a single session the user and dispatcher may communicate continuously and in real-time via text-to-speech, speech-to-text, as well as traditional voice or another form of Internet based communication capable of transmission of multimedia messages. Text-to-text and video/photo sharing is also enabled if the emergency dispatch center possesses an IP connection to the Internet. One embodiment of a method for constructing such messages includes, after receiving a prompt from a user, generating an emergency message related to the respective emergency category. The generated emergency message may then be communicated over a communications network, such as the Internet. Another embodiment relates to a system that dynamically selects the fastest and/or most secure method route to transmit the message, whether via cellular connection, data connection over the Internet using SIP, SMS, Bluetooth, WiFi, etc. Such connection can then be continually or periodically sampled or monitored and adjusted based on the connection strength and channel quality based on industry accepted measures such as goodput, throughput, congestion status, queue length at servers, availability of certain routers and switches along the communication channels between the user communication device and the EMS and vice-versa and the EMS and the EDC and vice-versa.

Aspects and embodiments disclosed herein further provide for a number of DID TNs to be provisioned for the purpose of emergency response. These DID TNs are assigned to a user communication device on provisioning of the first communication link between the EMS and the user communication device and the assignment is maintained for a period of time until after the first communication link between the EMS and the user communication device is terminated. The assigned DID TN is communicated by the EMS to the EDC over a second communication link and can be used by the EDC in order to re-establish a call back to the user communication device or to provision other network communication resources.

In accordance with one embodiment, there is provided a process of setting up a communication link, using an EMS as a trunking or routing mechanism, between a user communication device and an EDC such as a PSAP. This communication link is used for transmission of partially preformatted emergency voice message, SMS, speech-to-text, voice-to-text, VoIP packets, SIP control messages, and/or other multimedia messages between the user communication device and the EDC via the EMS.

FIG. 1 is an illustration of one embodiment of an environment for generating and communicating a multimedia message such as a partially preformatted emergency voice message, Short Message Service ("SMS") message, e-mail, or another form of a multimedia message that can be sent over the Internet, by a hardware device such as user communication device 101, to an emergency dispatch center ("EDC") such as a Public Safety Answering Point ("PSAP"). A user 100 wishes to place an emergency call to an emergency service, for example to 911. The user 100 may request assistance by activating an alerts feature on his or her user communication device 101, hardware specification details of which are as described below. This alert may include meta-data identifying the user's location and/or the nature of the emergency. Using a user communication channel 107, such as a wireless link to one of a WiFi router, a cellular network, a bluetooth device or any other form of wireless or wired communication, the user communication device transmits this meta-data to an emergency messaging system ("EMS") 103 capable of initializing and managing VoIP calls over a communication network such as the Internet. The EMS can comprise any appropriate network entity, such as, for example, a Short Message Service Center ("SMSC") for sending Short Message Service ("SMS") messages, an Application Programming Interface (API) 116 (see FIG. 4) for receiving control messages, such as SIP messages, and multimedia messages from the user and management of communication sessions, a PBX for setting up and hosting VoIP and Analog phone calls, databases for user and phone number, fileservers, routers, load balancers and network address translators (NAT) or any other form of hardware device capable of transmission, reception and storage of information over the Internet. The user communications device 101 may select the appropriate mechanism of transmission by selecting an appropriate user communication channel (e.g. a link to a WiFi, cellular, SMS, or Voice network or device) based on one or more variables, for example, network availability, bandwidth constraints, security, and any other metric as suitable to assess communication link quality. Once the EMS receives this meta-data the EMS combines the data received with information about the user already stored on the servers within the system (such as the user's medical history) and then, in one embodiment, transmits, using a provider communication channel 106 which can be any form of communication channel used over the Internet, for example, a fiber optic channel, a microwave channel, a copper cable, or other form of communication medium, a bundled emergency message with Interactive Voice Response ("IVR") capabilities 109 to a RSP 104. The RSP then transmits the emergency message to an EDC 105 (e.g., university dispatch center, corporate dispatch center, PSAP etc.) over communication channel 108. Communications channel 108 may include a public switched telephone network ("PSTN") channel or a cellular network channel. Alternately, in another embodiment the EMS 103 transmits either the bundled emergency message directly to the EDC 105 or sends the meta-data received from the user in the same form as received from the user over an IP channel after a determination that the selected EDC 105 has the capabilities to receive digitally formatted data messages such as SMS, MMS, e-mail message or any other form of multimedia message. The EMS 103 then bridges the user communication channel and the provider communication channel so that selected communication on one channel can be accessed by the other channel.

Figure 2:
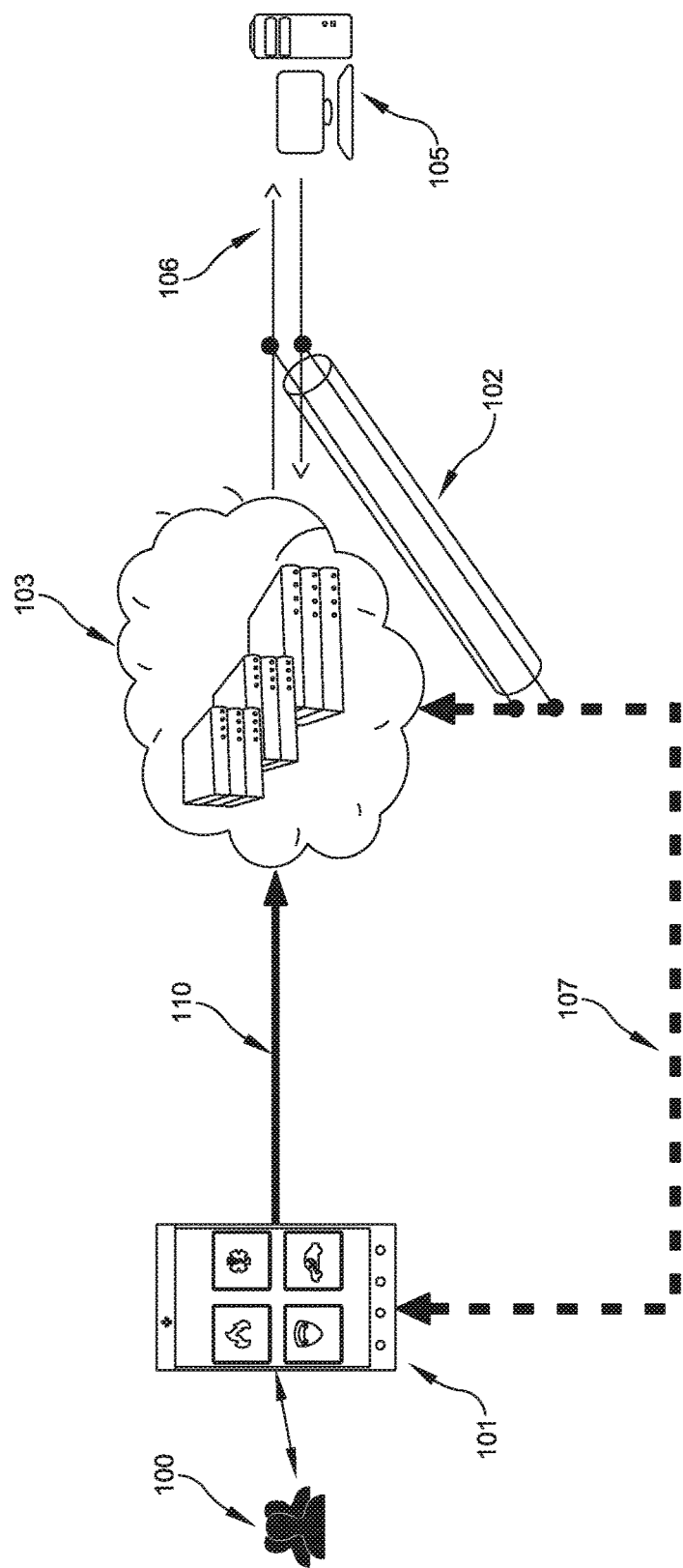
FIG. 2 illustrates communication channels between an EMS and a user communication device and between the EMS and an EDC and the bridging of the two communication channels so as to allow the user communication device and the EDC to communicate with each other.

FIG. 2 describes one embodiment of bridging of the two sessions, 1) from EMS 103 to user communication device 101 (i.e., the user communication session) and 2) from EMS 103 to EDC 105 (i.e. the provider communication session). FIG. 2 also illustrates one embodiment of the bridging of these two sessions for purpose of communication between user communication device 101 of user 100 and EDC 105. After receiving a request for assistance 110 either as an IVR 109, SMS, VoIP call, MMS or any other form of Internet based communication from the user communication device 101, the EMS 103 establishes two separate communication sessions via the user communication channel 107 and the provider communication channel 106 as described above. These sessions can be VoIP sessions set up using Session Initiation Protocol (SIP), VoIP sessions not setup using SIP, a phone call using a cellular network, a phone call using analog cellular communication, or a combination of these methods or another form of a multimedia communication session over the Internet. Once both of these communication sessions are set up the EMS then creates a communications bridge 102 bridging together the two sessions such that selected messages sent from the user communication device to the EMS are forwarded to the EDC and selected messages from the EDC to the EMS are forwarded to the user communication device.

Figure 3:
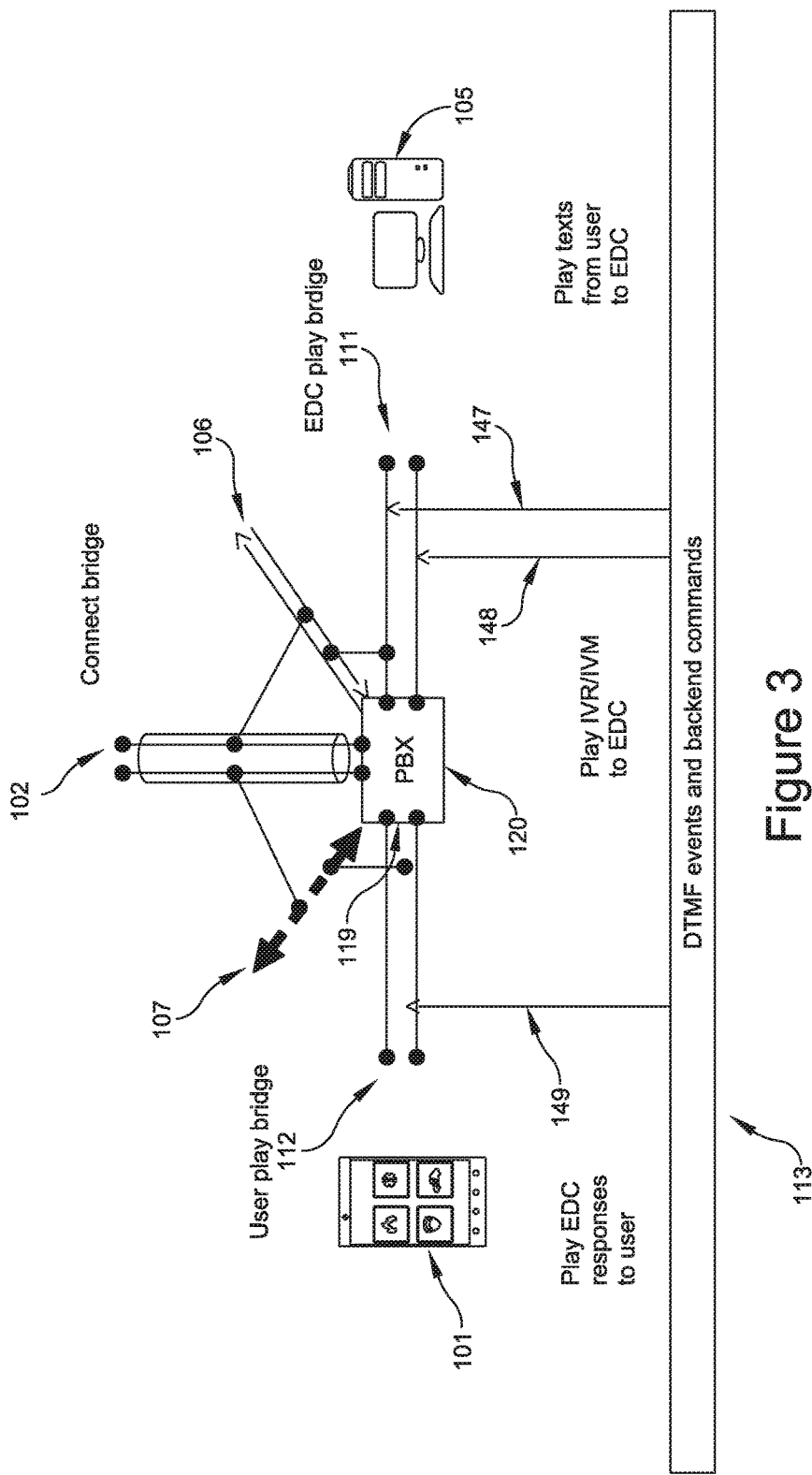
FIG. 3 outlines one embodiment of implementation of communication sessions and bridging of the communication sessions over the communication channels illustrated in FIG. 2.

FIG. 3 illustrates one embodiment of the setup and configuration process of the user communication session and provider communication session using a private branch exchange (PBX) telephone system 120, which is a part of the EMS 103. In this particular embodiment, the PBX 120 initiates a connection with the user communication device 101 using "User communication channel" 107 and a connection with EDC using "provider communication channel" 106. The connect bridge 102 bridges the two channels using a pre-defined bridging process implemented either in software or hardware. Messages played on connect bridge 102 are audible by the user 100 using the user communication device 101 and the EDC 105, enabling communication between user 100 and EDC 105. Messages 149 from the EDC 105 are played only for the user 100 on user play bridge 112 and text messages 147, converted to IVR in real-time, from user 100 and IVR/IVMs 148, pre-recorded using metadata of the user, are played to the EDC 105 on EDC play bridge 111. The presence of new messages from user 100 are detected by the EMS 103 using Dual Tone—Multi Frequency ("DTMF") signals 113 and are played back for the EDC 105. These events are based on either a request by the user 100 or the EDC 105 or by a system event such as receipt of SMS, MMS, e-mail or other form of messages over the Internet by the EMS 103 on the user communication channel 107 or the provider communication channel 106. FIG. 3 further illustrates a subset of the software subroutines used to initiate and maintain communication between the EMS 103 and the user communication device 101, and the EDC 105.

Figure 4:
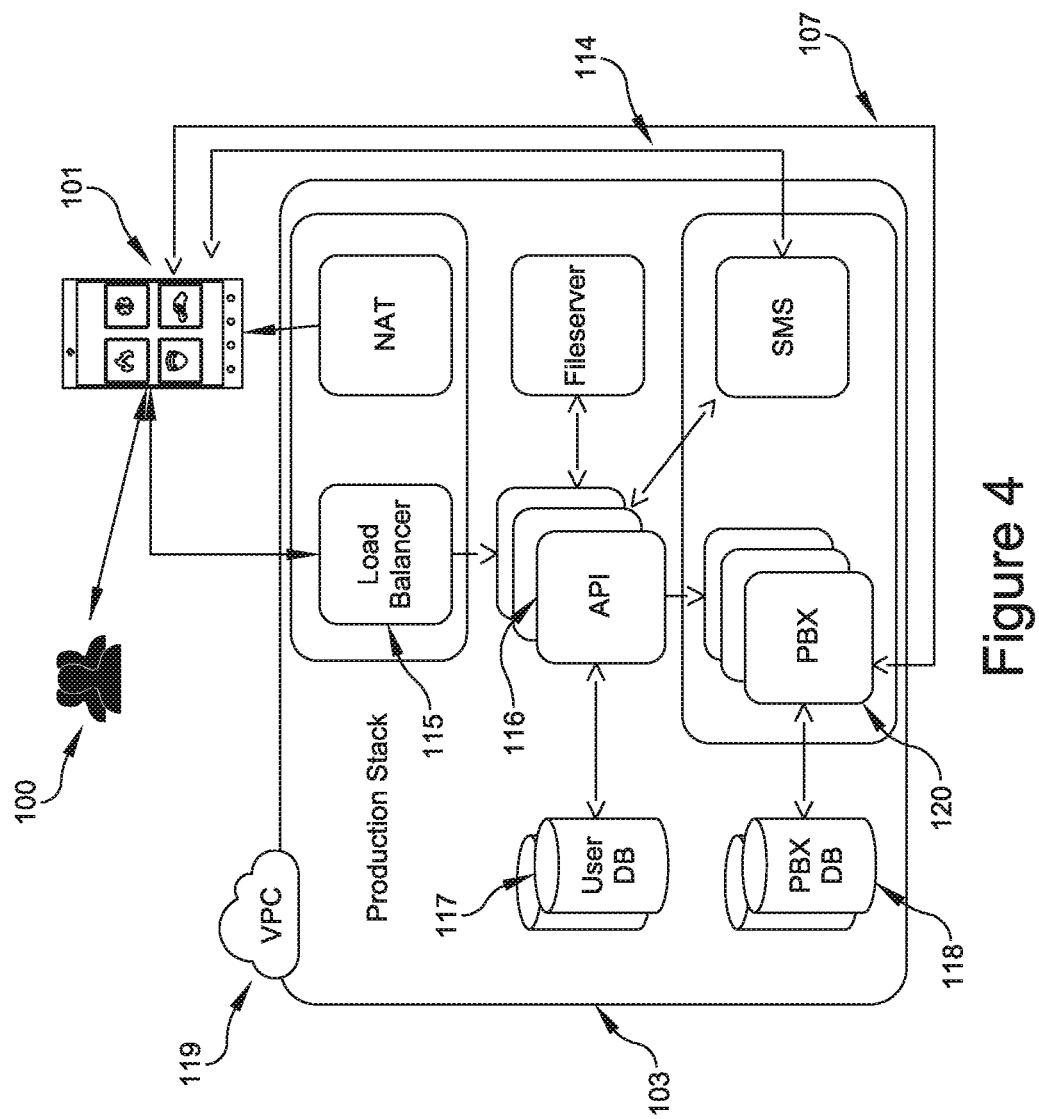
FIG. 4 outlines the hardware components that comprise an embodiment of an EMS and an embodiment of an architectural layout of the same.
Figure 5:
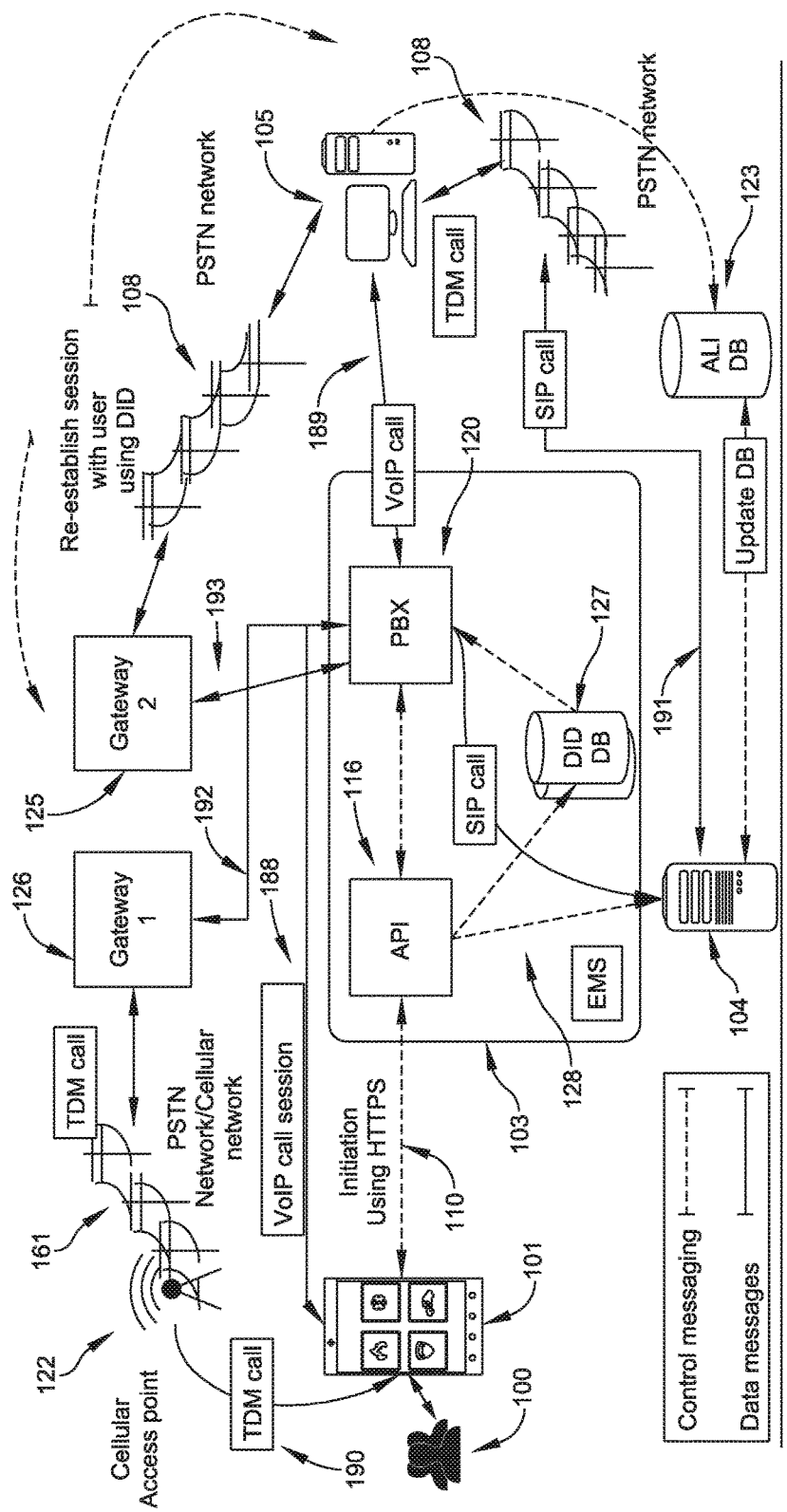
FIG. 5 illustrates details of one embodiment of a process by which a communication session may be setup between a user communication device and an EDC.

FIG. 4 illustrates one embodiment of the hardware layout of the EMS 103. EMS 103 includes at least one Application Programming Interface ("API") 116, an embodiment of which is implemented in software for purposes of setting up and configuring voice or audio sessions. The API 116 software is capable of receiving a request for assistance from the user 100, and from the nature of the request, allocating resources from the EMS to respond to the request for assistance. The API 116 communicates with a user database 117 to verify and manage information about the user 100, such as meta-data and any other data received from the user 100 either during an active communication session over the user communication channel 107 or preset for the user 100 by the EMS 103. The API 116 also communicates with at least one PBX 120, also a sub-system of the EMS 103, for initiating and managing the communication on the user communication channel 107 and provider communication channel 106. The PBX 1120 maintains a PBX database ("PBX DB") 118 containing a set of numbers each of which can be used for placing a voice call over the Internet using Internet Protocol (e.g. VoIP). The API 116 communicates with the user communication device 101 using a "load balancer" 115. The load balancer 115 is configured to distribute communications among the various APIs 116 so that no one API 116 becomes overloaded. The API 116 manages the communication between the user communication device 101 and the EDC 105, including re-establishment of communication on the user communication channel 107 and provider communication channel 106 in case either or both of these communication sessions disconnect due to any reason. The voice/audio connection to the EDC 105 is made via the PBX 120 and may be completed via an end-to-end VoIP session or a partial voice over IP session and, in some embodiments, is combined with a cellular call or a PSTN call, between the PBX 120 and the EDC 105. The PBX 120 communicates with the EDC 105 and the user communication device 101 using end-to-end VoIP sessions as the main communication link if such a communications link is available, and uses a partial VoIP session combined with a cellular call or a PSTN session as a secondary option. In instances where a full VoIP session cannot be established using protocols such as SIP, partial trunking over the cellular network/PSTN network is accomplished by PBX 120 by sending a VoIP session request to a edge router (such as session border controllers, gateway or a SIP server or a SIP trunking device as illustrated in FIG. 5 below), which may or may not be included within the EMS 103. The edge router in turn trunks the VoIP call over a cellular network/PSTN. The user communication device 101 also has ability to communicate with the API 116 via a separate channel 114 using SMS and other short messaging services in instances when the VoIP session may not be able to deliver multimedia messages from the user communication device 101 to the EMS 103 or when a separate communication session is needed. Additional security and reliability is achieved for the management of the communications between the user communication device 101 and the EMS 103 by employing virtual private clouds 119—on demand configurable pools of shared computing resources allocated within a public cloud environment, providing isolation between the different organizations using the resources.

FIG. 5 illustrates details of one embodiment of a process by which a communication session may be setup between a user communication device 101 and an EDC 105. FIG. 5 also illustrates one embodiment of a process by which a communication device 101 is assigned a fixed landline phone number, DID TN, for the duration of a communication session for the purpose of call backs to the user communication device 101 when the user communication device 101 does not have a assigned TN, for example, when the user communication device is an iPad® tablet computer or other tablet computer, a wearable device, a sensor for example, a wearable device including a watch or an environment sensor including temperature sensors for homes, or another Internet enabled end device not having an assigned telephone number. The user 100 requests assistance by sending a request for assistance 110 using internet protocols such as HTTP, to the API 116 of the EMS 103. The API 116 initiates the setup of a first communication link, which can be an end-to-end VoIP session 188 or a partial VoIP session 192 combined with a cellular call or a PSTN call 190, using the user communication channel 107 (which can be a combination of a IP channel 192 and a PSTN channel 161 or a complete VoIP channel performing a VoIP call 188) between the user communication device 101 and the EMS 103 and a second communication link, an end-to-end VoIP session 189 or a partial VoIP session 191 combined with a cellular call or a PSTN call 108, using the provider communication channel 106 (which can be a combination of a IP channel 191 and a PSTN channel 108 or a IP channel 193 and a PSTN channel 108 or an end-to-end IP channel 189), between the EMS 103 and EDC 105 using a sequence of control channels used to carry call setup and maintenance information 128 between the API 116, RSP 104, PBX 120 and DID DB 127 and other components of the EMS 103 and the Internet used to setup the user communication channel and the provider communication channel. The EMS 103 bridges the first and second communication links so that the user 100 and the EDC 105 can communicate in real-time using voice, text-to-speech, speech-to-text, SMS, MMS, e-mail or other forms of multimedia messages. In one embodiment, bridging of the first and second communication links is accomplished using software in certain implementations of a PBX, for example, an Asterisk™ telephony switching and private branch exchange service, where multiple software subroutines, each corresponding to one data channel carrying voice packets, are used to conference these data channels together such that voice packets on one channel are multicast on all other data channels on the conference bridge.

The PBX assigns a DID TN to the user communication device 101 from the direct in-ward dial database ("DID DB") 127 which is a hardware device capable of storing a pool of DID TNs that are pre-allocated for use by the EMS 103 for the purpose of communicating with a user communication device 101, such that a phone call can be established to the communication device using a cellular network/PSTN using this DID TN as the identifier, and the user communication device can use the DID TN to make a cellular or PSTN call if the hardware on the user communication device is capable of initiating and maintaining such a call. When a user communication device 101 sends a request 110 to initiate an emergency response to an EMS 103, the EMS 103 assigns a DID TN to the communication device. Once the API 116 of the EMS 103 assigns a DID TN to the user communication device 101, the DID TN, along with stored meta-data of the user 100, is sent to the RSP 104 which then inserts this information in the automatic location identification database ("ALI DB") 123 for reference by the EDC 105 or other network devices. Once the two sessions, 1) the user communication session and 2) the provider communication session are setup, the EMS 103 assigns the DID TN to these two sessions. These two sessions can each be individually setup by either a) a direct end-to-end VoIP call or b) a SIP call trunked via a cellular network/PSTN using a Gateway 2 125, capable of trunking SIP calls, a RSP 104, or a combination of a cellular and a PSTN network 161, which includes a PSTN network 108 and a cellular access point 122, Gateway 1 126, also capable of trunking SIP calls. The EDC 105 may use this same telephone number, the DID TN, to re-establish a communication session via Gateway 2 125 with the EMS 103 in case the session from the EMS 103 to the EDC 105 is terminated for any reason. The EDC 105 may re-establish a communication session with the EMS 103 to receive text messages 147 from user or IVR/IVMs 148 created from meta-data for and about the user 100 or to communicate in real-time with the user communication device 101. The DID TN is also useful in re-establishing a communication link with a user communication device 101 in circumstances where the user communication device 101 is not assigned a phone number, for example, when the user communication device is an iPad® tablet computer or other tablet computer, a wearable device, a sensor, or another Internet enabled end device not having an assigned telephone number. The EDC 105 uses one of many options to re-establish the session with the EMS 103 such as a end-to-end VoIP session or a partial VoIP session combined with a cellular call or a PSTN call. The DID TN can be assigned based on the location information provided by the user communication device 101, or on a non-location specific basis. The EMS 103 further maintains the association of the assigned DID TN with the two sessions, the user communication session and the provider communication session, for a suitable amount of time for the sake of re-establishment of communication sessions even after the two sessions are terminated.

FIG. 6 through FIG. 10 display several embodiments of a user interface 129 for a user communications device 101. Embodiments of the user interface 129 are capable of receiving an input from a user 100 either by touch (for example, through a touch screen, external keyboard, mouse, or other pointing device), voice, gesture or other form of interaction of a user 100 with a hardware or software entity hosted on the user communications device 101, and transforming the interaction into a message, such as an SMS, MMS, speech-to-text, voice-to-text, and other forms of Internet multimedia messages capable of being transmitted over the Internet. The user interface 129 is further capable of reporting to the hardware mechanism of the user communication device 101 an indication of an interaction of the user 100 with the user interface 129, including providing an indication of a selection of one of a plurality of soft-buttons 130, 131, 132, 133 by the user 100. The selection of one of a plurality of soft-buttons 130, 131, 132, 133 by the user 100 may be performed by one or more of touch, voice, or another form of interaction between the user 100 and the user communication device 101. Responsive to receiving the indication of the selection of one of the plurality of soft-buttons 130, 131, 132, 133 by the user 100, the user communication device 101 can transmit an associated message, via the user communication channel 107, to the EMS 103 indicating the selection of the specific one of a plurality of soft-buttons selected by the user 100. The user interface 129 is further capable of continuing to receive additional information from the user 100 and providing information about the interaction to the hardware mechanism of the user communication device 101 in a form that can be transmitted over the Internet by the user communication device 101 to the EMS 103.

Figure 6:
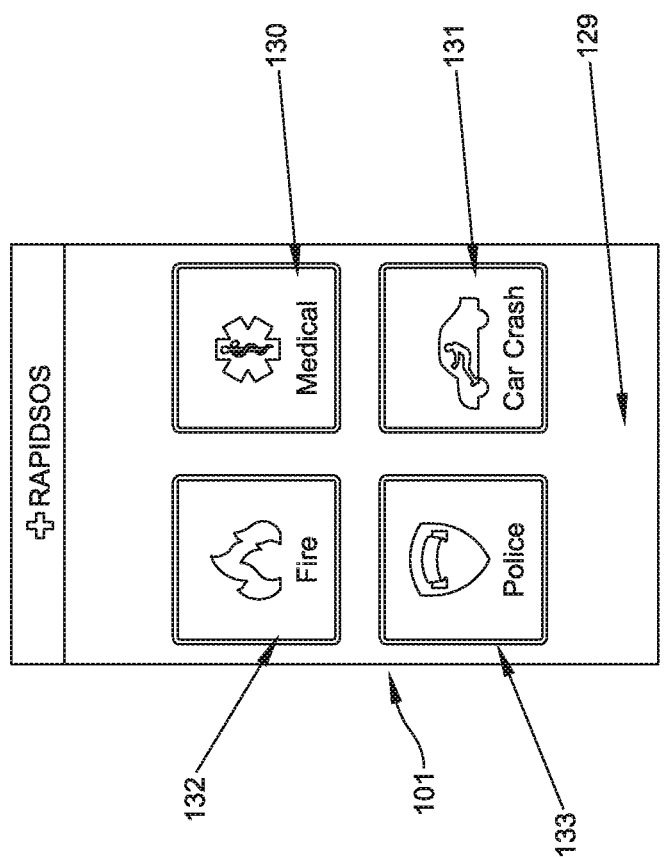
FIG. 6 illustrates an embodiment of a user interface of a user communication device configured to communicate an emergency message such that the user can select one of a plurality of emergency situations.

FIG. 6 is an illustration of one embodiment of the user interface 129 on a user communications device 101 configured to generate a multimedia message such as a SMS, MMS, e-mail, speech-to-text, text-to-speech or other form of multimedia message capable of being communicated over the Internet. The multimedia message includes an indication of selection of one of a plurality of soft-buttons 130, 131, 132, 133 by the user 100. The user communications device 101 communicates the multimedia message via the user communication channel 107, to the EMS 103. The user communication device 101 may include a user interface 129 for communicating visual data, such as text, to a user 100. In the particular embodiment illustrated in FIG. 6, the user interface 129 depicts a touch enabled display containing a number of fields used in populating a preformatted multimedia message. This particular embodiment illustrates soft-buttons representing preformatted messages for fire 132, medical 130, or police 133 assistance, as well as for assistance in a car crash 131. One skilled in the art would readily understand that various other soft-buttons signifying other types of emergencies could be utilized. In various embodiments, the emergency message may be communicated to the EDC 105 in the form of a voice message, e-mail, text, or some other form of multimedia messages.

Figure 7:
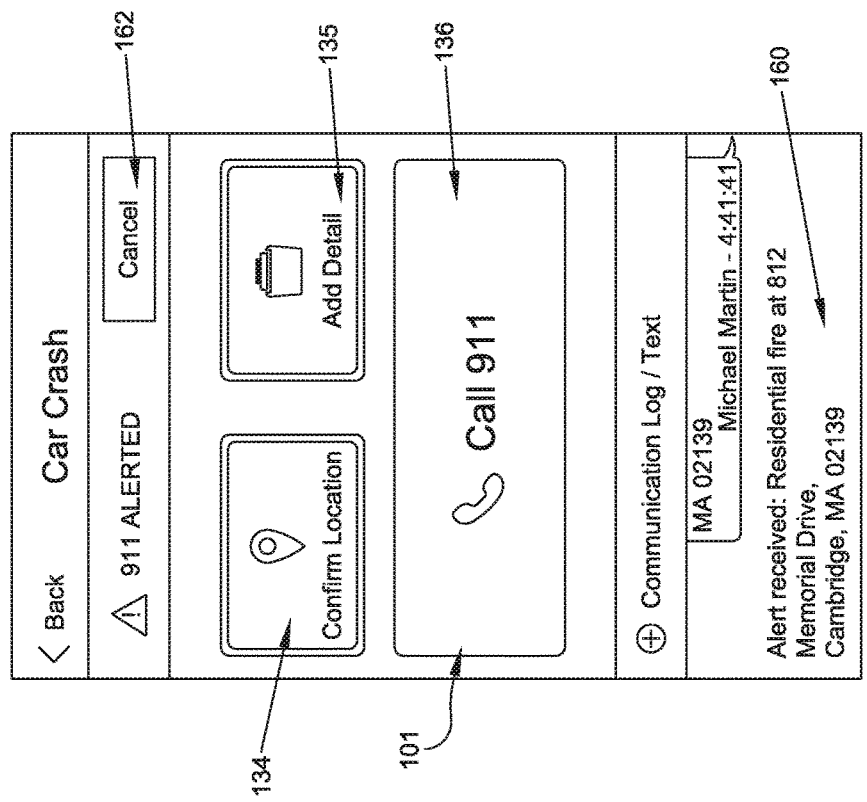
FIG. 7 illustrates another embodiment of a user interface of a user communication device configured to communicate an emergency message wherein the user interface allows the user to confirm the location of the user communication device, add detail to the selected emergency situation, cancel the request, call 911 through Cellular or PSTN network or view a communication log between the user communication device and the EDC.

FIG. 7 illustrates another embodiment of a user interface 129 on an user communications device 101 in which the user 100 is prompted to confirm his/her location 134 or insert additional details 135 about the nature of his/her emergency, including selection one of the many modes of communication, such as text using SMS 160, or instant messaging. The user 100 may also utilize the user interface 129 to directly call an EDC 105 using either a cellular network or PSTN.

Figure 8:
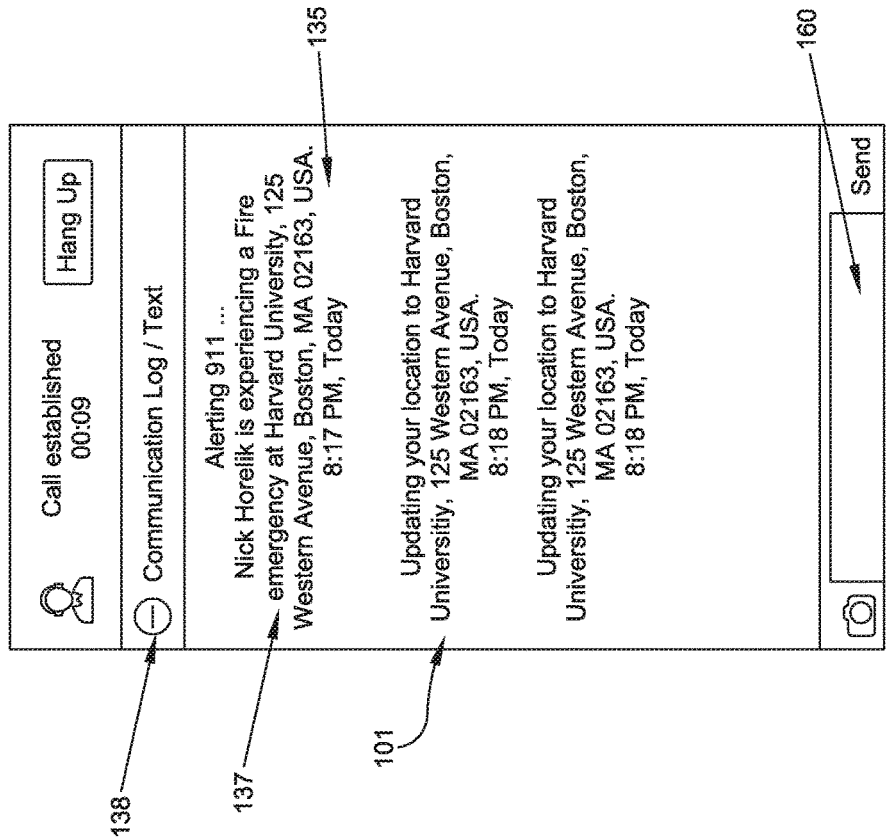
FIG. 8 illustrates another embodiment of a user interface of a user communication device configured to communicate an emergency message wherein the user interface allows the user to view a communication log or cancel the request using a "Hang Up" button.

FIG. 8 illustrates another embodiment of a user interface 129 such that a "communication log" 138, containing a time-stamped sequence of status update messages 137, correlating to information in selected messages from the multimedia sessions between the user 100 and the EDC 105, SMS messages, SIP packets, VoIP packets or other forms of messages sent over the user communication channel or the provider communication channel or messages generated by the EMS 103 or the user communication device 101. The communications log 138 is displayed to the user 100 through the user interface 129 hosted on the user communication device 101. The user interface 129 is further capable of updating the status messages in the communication log 138 in real-time as multimedia messages are generated and transmitted by the user communication device 101 in response to the user 100 interacting with the user communication device 101 via the user interface 129 or when messages are received by the EDC 105 sent in response to the emergency request 110 initiated by the user 100, or when the user communication device 101 receives updates from the cellular network/PSTN such as location from GPS, proximity to a resource of interest such as an EDC 105 from the EMS 103, or other information about the device, or any other multimedia message is received by the user communication device 101 in response to the initiation of an request for emergency assistance 110 by the user 100.

Figure 9:
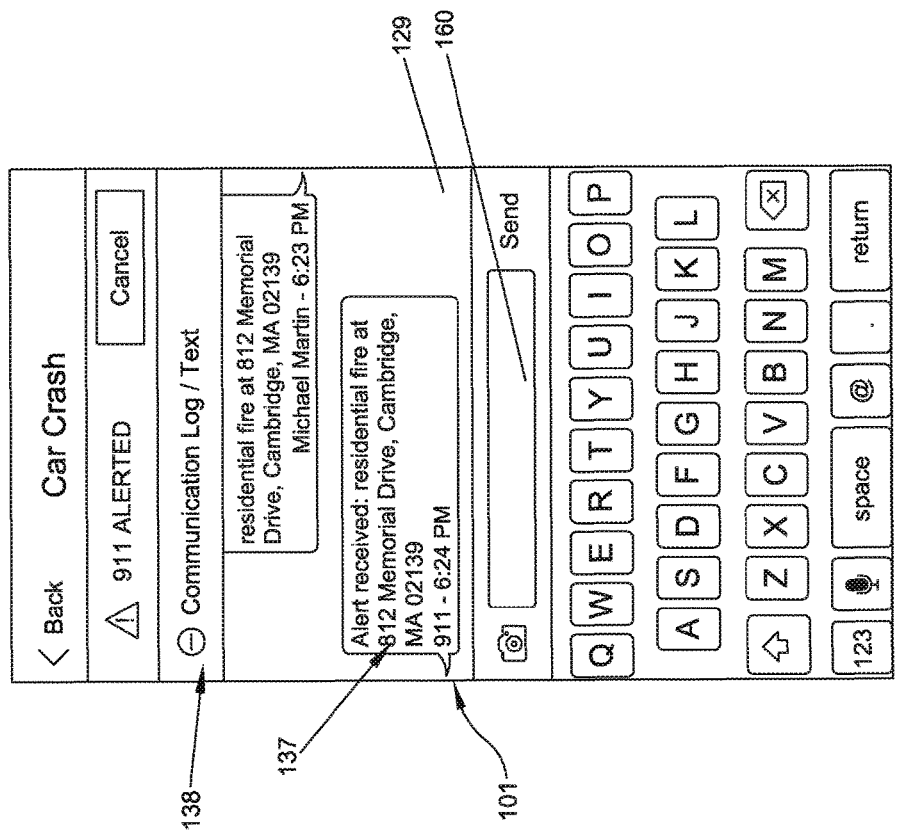
FIG. 9 illustrates another embodiment of a user interface of a user communication device configured to communicate an emergency message wherein the user interface allows the user to send additional information about the alert, view a communication log or cancel the alert.

FIG. 9 illustrates another embodiment of a user interface 129 that provides for the user 100 to insert his/her own freeform (i.e., un-preformatted) message in a message field 160 by interacting with the user interface 129, either by touch, voice, gesture, or other form of interaction of a user 100 with a hardware or software entity of the user communication device 101, as well as to receive session status updates 137 via a Communication Log 138.

Figure 10:
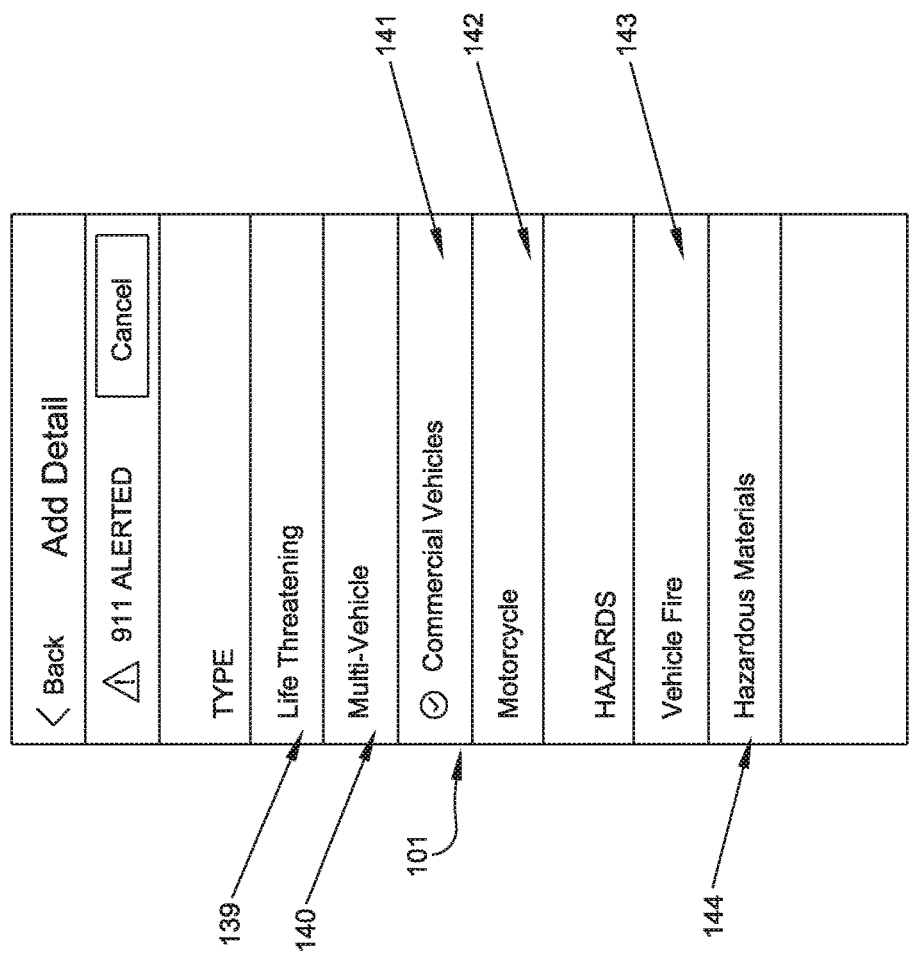
FIG. 10 illustrates another embodiment of a user interface of a user communication device configured to communicate an emergency message wherein the user interface allows the user to select further categories that describe the emergency situation better, or cancel the alert all together.

FIG. 10 illustrates another embodiment of a user interface 129 on an user communication device 101 in which the user 100 is enabled to specify information in addition to the preformatted message sent by the user communication device 101 in response to the user 100 selecting one of a plurality of soft-buttons displayed by the user interface 129. In this embodiment, the options presented for selection of a pre-formatted message relate to vehicle accidents, such as whether the accident is life-threatening 139, involves multiple vehicles 140, involves commercial vehicles 141 or a motorcycle 142 or if other hazards, such as a fire 143 or hazardous materials 144, are involved. One skilled in the art would readily understand that such granular detail could be extended to other types of accidents and thus additional or alternative additional detail selectors could be provided on the user interface.

Figure 11:
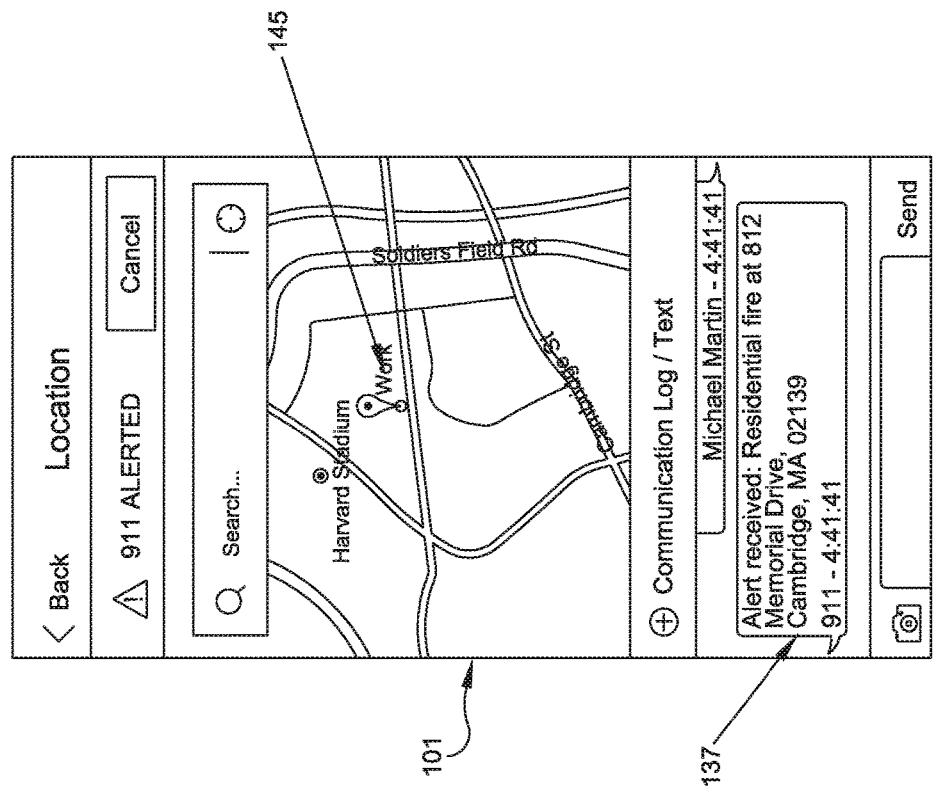
FIG. 11 illustrates another embodiment of a user interface of a user communication device configured to communicate an emergency message wherein the user interface allows the user to select a specific location on a geographic map.

FIG. 11 illustrates another embodiment of a user interface 129 that shows the use of location services on the user communication device 101 to define pre-set geographic locations 145, for example, place of employment, home location, or other geographic places of interest by the user 100 where the pre-set location is stored in user DB 117 and used by the EMS 103 in selecting messages to send over the user communication channel to the user communication device 101. Further, in this embodiment the user interface 129 capable of displaying the status updates 137 to the user 100 on a real-time basis.

Figure 12:
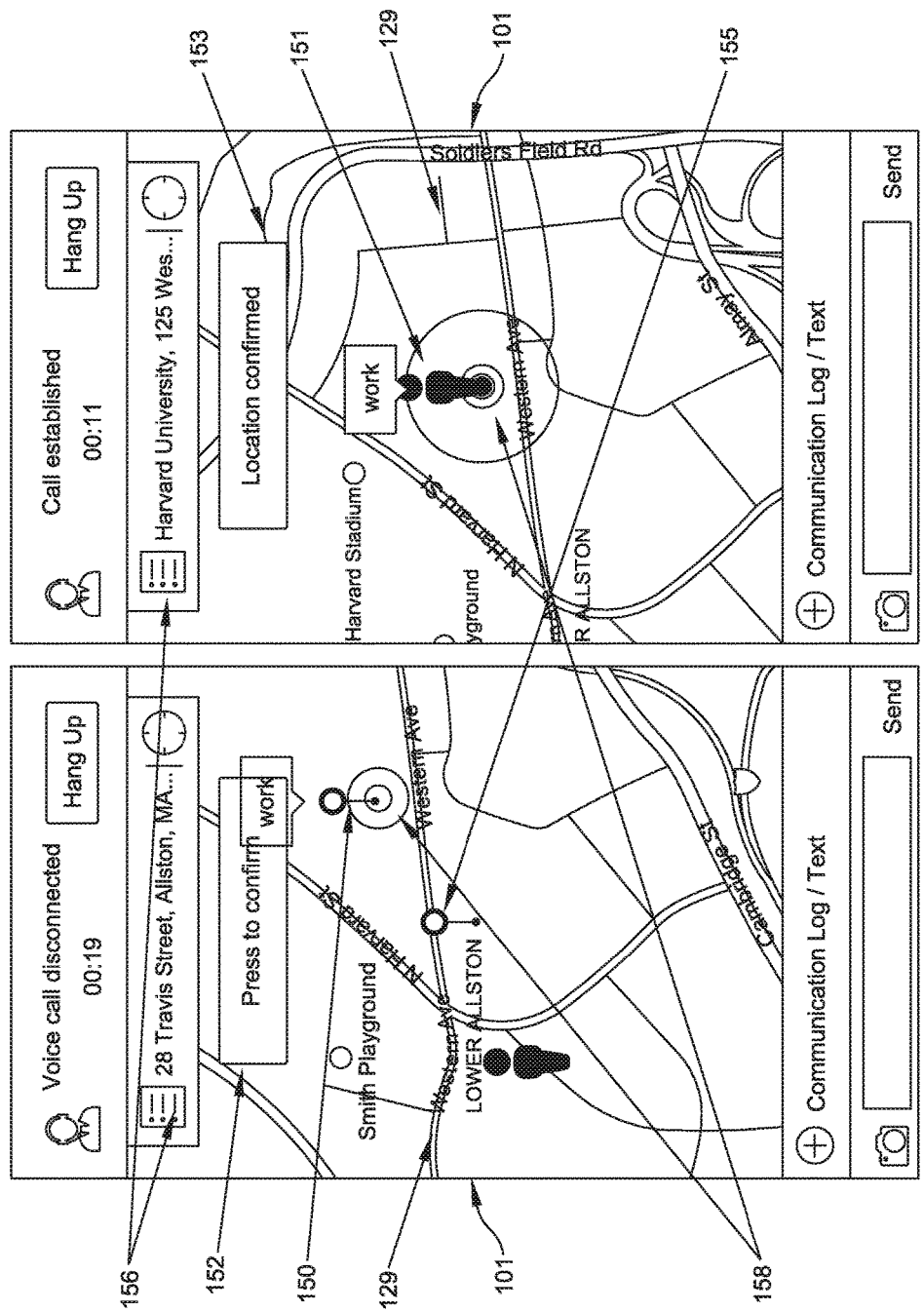
FIG. 12A illustrates another embodiment of a user interface of a user communication device configured to communicate an emergency message wherein the user interface allows the user to select a specific location on a geographic map including selecting a predefined location and confirm the selected location.
FIG. 12B illustrates another embodiment of a user interface of a user communication device configured to communicate an emergency message wherein the user interface allows the user to select a specific location on a geographic map including selecting a predefined location and confirm the selected location.

FIGS. 12A and 12B illustrate two separate instances of another embodiment of a user interface 129 wherein the user 100 is able to specify and confirm his or her location in additional detail, if the user 100 chooses to do so, on a real-time basis. In this particular instance, as illustrated in FIG. 12A, the user 100 has a choice to select a pre-defined location 150 or to select a geographic location 158 provided by a location service on the user communication device 101. The geographic location 158 is in some embodiments provided to the location service of the user communication device 101 by, for example, a GPS receiver of the user communication device 101. The user 100 may alternatively choose a specific location identified by the user 100 by interacting with the location service on the user communication device 101 via the user interface 129, illustrated in FIG. 12A as a software implemented location indicator 155 within the location service hosted in the user communication device 101. The location indicated by the software implemented location indicator is show in the location service using a text box 156 for the benefit of the user 100. The specific embodiment illustrated in FIGS. 12A and 12B includes a "confirmation button" 152 implemented in software that allows the user to confirm a user selected location with the location service on the user communication device 101. The embodiment illustrated in FIGS. 12A and 12B further includes a "confirmation indicator" 153 that provides an indication to the user 100 of the user communication device 101 that the user selected location is received by the location service on the user communication device 101. The embodiment illustrated in FIGS. 12A and 12B further includes a digital illustration 151 that provides an indication to the user 100 of the user communication device 101 of the selected geographic location. The geographic location may be selected by the user 100 of the user communication device 101 by selecting one of either a pre-defined location 150 or geographic location provided by a location service 158 on the user communication device 101. The geographic location may be edited by the user 100 by interacting with the location service. The user interface 129 may further provide an indication to the user 100 that a choice has not been made by the user 100 of the geographic location of the user communication device 101, for example, by providing the "Press to Confirm" button 152.

Figure 13:
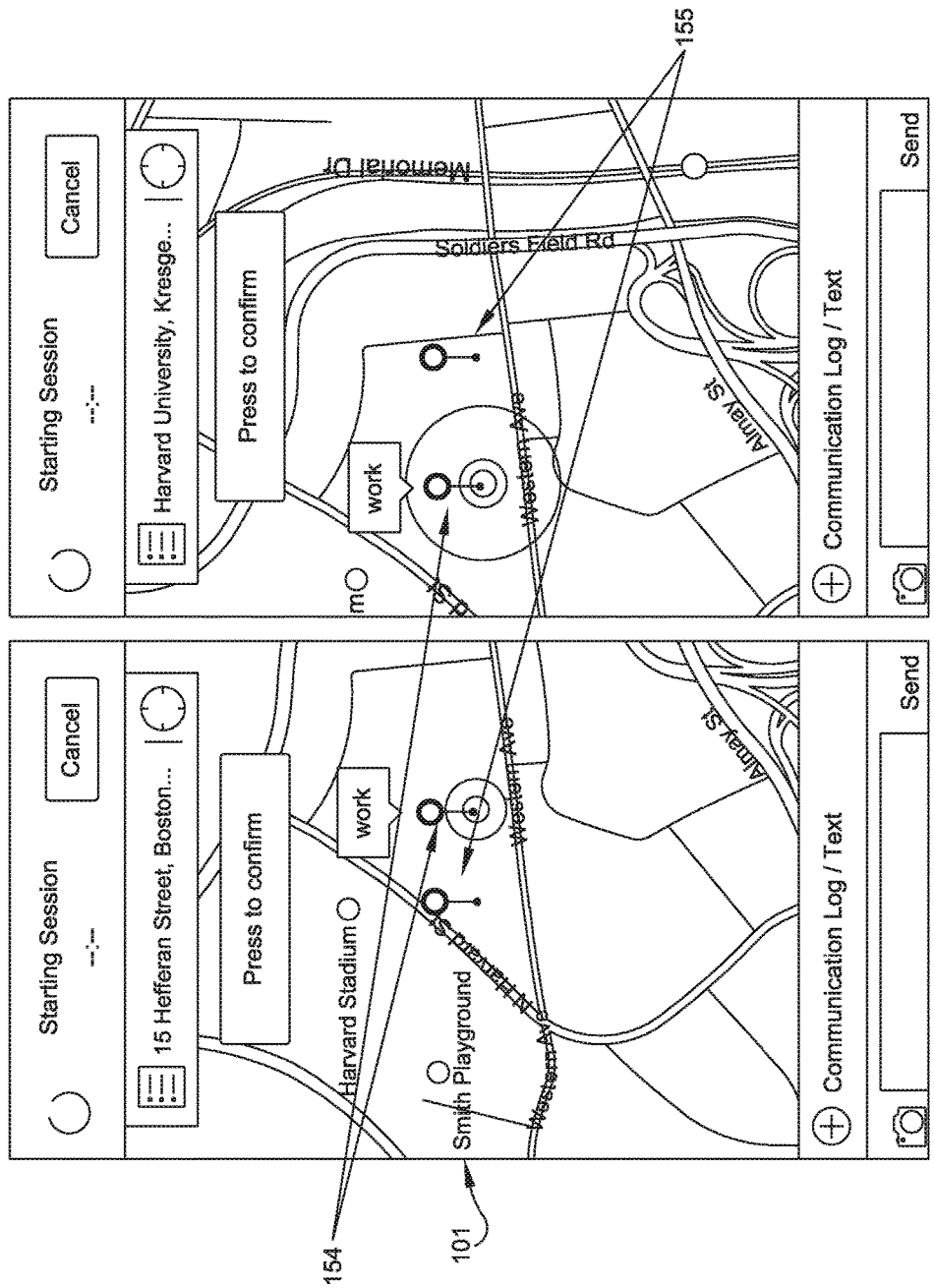
FIG. 13A illustrates another embodiment of a user interface of a user communication device configured to communicate an emergency message wherein the user interface allows the user to select a specific location on a geographic map including selecting a predefined location and confirm the selected location.
FIG. 13B illustrates another embodiment of a user interface of a user communication device configured to communicate an emergency message wherein the user interface allows the user to select a specific location on a geographic map including selecting a predefined location and confirm the selected location.

FIGS. 13A and 13B show two instances of an embodiment of a user interface 129 showing a location service, where the user 100 is able to interact with the location services showing, in real-time, a location sensitive map of the geographic location the user communication device 101 is placed in, and through which the user may select a location to be transmitted to the EMS 103. The user 100 can change the location to be transmitted, shown in real-time instantly by the software implemented location indicator 155, by interaction with the location service on the user communication device 101 by one or more of touch, voice, gesture, or other form of interaction of a user 100 with a hardware or software entity of the user communication device 101.

Figure 14:
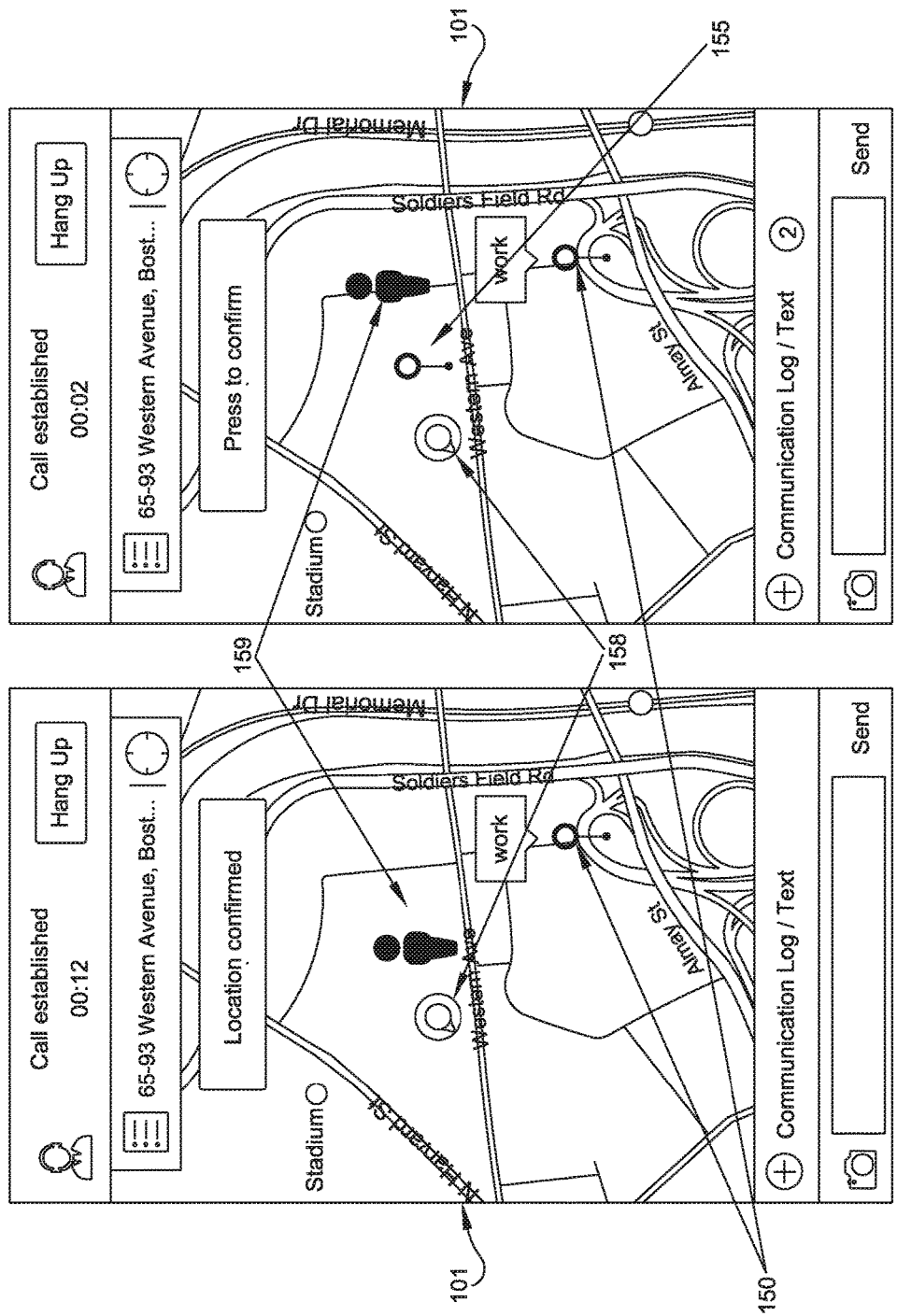
FIG. 14A illustrates another embodiment of a user interface of a user communication device configured to communicate an emergency message wherein the user interface allows the user to select a specific location on a geographic map including selecting a predefined location and confirm the selected location.
FIG. 14B illustrates another embodiment of a user interface of a user communication device configured to communicate an emergency message wherein the user interface allows the user to select a specific location on a geographic map including selecting a predefined location and confirm the selected location.

FIGS. 14A and 14B show two instances of an embodiment of a user interface 129 showing a location service, where the user 100 is able to interact with the location service and confirm a location. The user 100 is able to confirm a location by choosing the geographic location indicated by the software implemented location indicator 155 and by interacting with the confirmation button 152 displayed in the user interface 129 by the location service. The selected location is confirmed by the location service to the user 100 of the user communication device 101 by a confirmation indicator 153.

Figure 15:
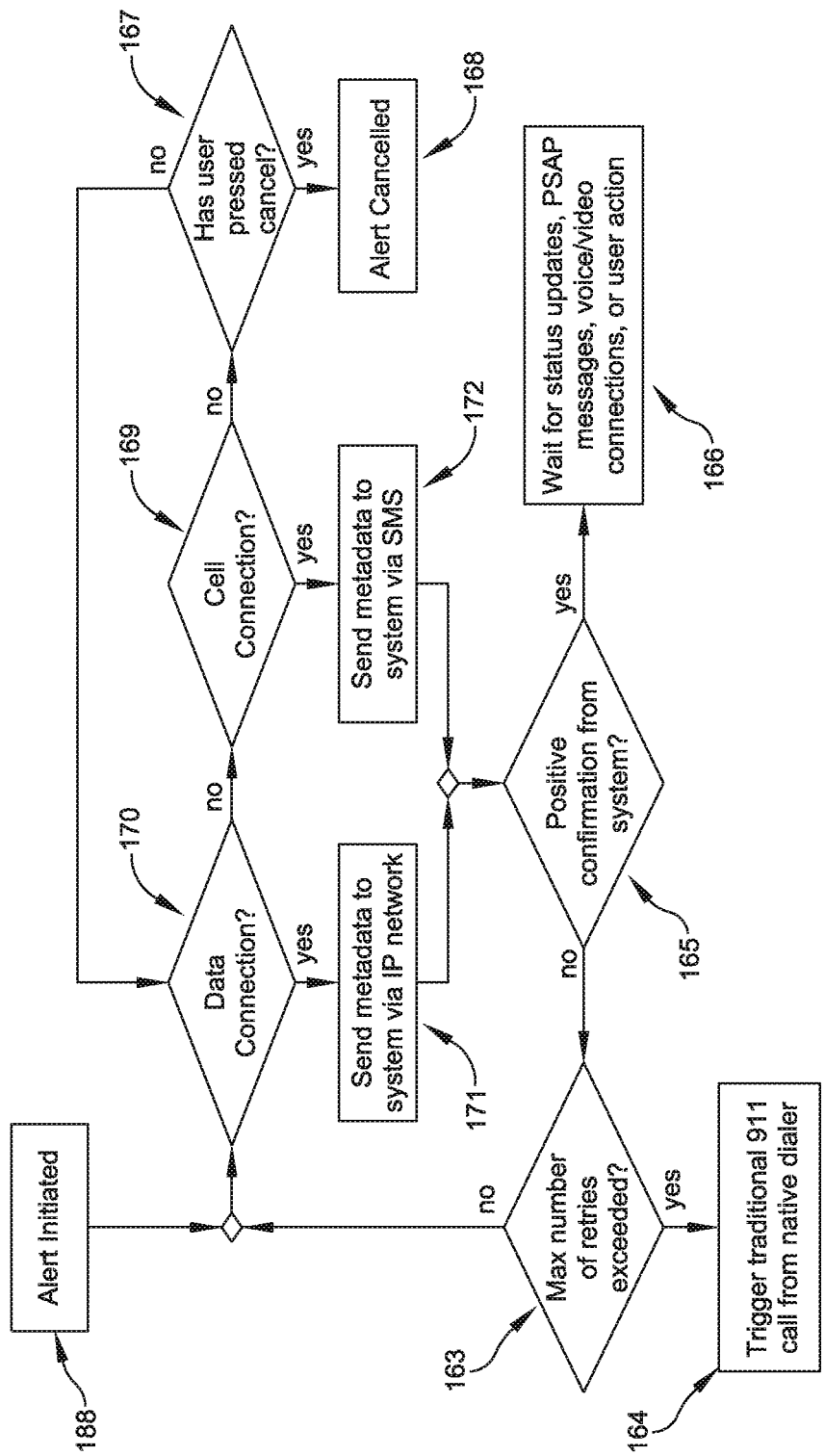
FIG. 15 is a flow chart of an embodiment of a method by which a request for emergency assistance may be communicated to an emergency dispatch center.

FIG. 15 is a flow chart illustrating one embodiment of a method by which a request for emergency assistance may be communicated, either from a user communication device 101 or from any other source, to an EDC 105 according to the principles disclosed herein. In this embodiment of the process to request for emergency assistance, a request for assistance alert 110 is initiated by the user communication device 101 of the user 100 (act 188) and sent to the EMS 103. In some embodiments, the request for assistance alert includes a selection of a most appropriate means of transmission of information between the user communication device 101 and EMS 103 and/or EDC 105 (acts 170, 169 and 168). The user communication device 101 first tries to send the emergency assistance message to the EDC 105 using a data connection (act 171), such as wi-fi, cellular data, or any other method by which IP-based communications can take place. Should a data connection not be available (act 170) as determined by the user communication device 101 by either continually or periodically sampling the connection strength and channel quality of various data communication channels available to the user communication device (cellular, SIP, SMS, etc.) based on industry accepted measures such as goodput, throughput, congestion status, queue length at servers, availability of certain routers and switches along the communication channels between the user communication device 101 and the EMS 103 and vice-versa and/or between the EMS 103 and the EDC 105 and vice-versa, data can also be communicated through the system via SMS 114 (act 172) as a second option if a reliable cellular connection is detected (act 169). In the event that a cellular connection is unavailable, as determined by the user communication device 101, by continually or periodically sampling industry accepted channel quality measures of a cellular connection, the user communication device 101 of the user 100 will continue attempting to send data until a connection is established or the user 100 manually cancels the alert 162 (acts 168, 167). Once data is successfully transmitted, the user communication device 101 waits for confirmation that the IVR/IVMs 148, or other form of the message containing the emergency information such as SMS 147, will be successfully generated, routed, and transmitted to the EDC 105 by the EMS 103. Upon successful confirmation (act 165), the system on the user communication device 101 may wait for system status updates 137 communicated by the EMS 103 or EDC 105 or another device on the Internet via the EMS 103, messages from the EDC 105, incoming voice/video calls, or user action (including entering text or speaking into the device) (act 166). If the EMS 103 responds with a negative confirmation or no confirmation is received within a certain pre-defined time period as indicated by the industry defined "Time-out" parameter of standard communication protocols such as TCP, SIP, ARQ and other reliable point-to-point or end-to-end communication protocols, the user communication device 101 tries sending the data a number of times, this number defined by the standard communication protocols and customizable by the user 100 or the EMS 103, and upon reaching the defined number of unsuccessful transmission attempts (act 163), finally falling back to a traditional 911 call through a cellular network or a PSTN using a native dialer of the using the user communication device 101 (act 164).

Figure 16:
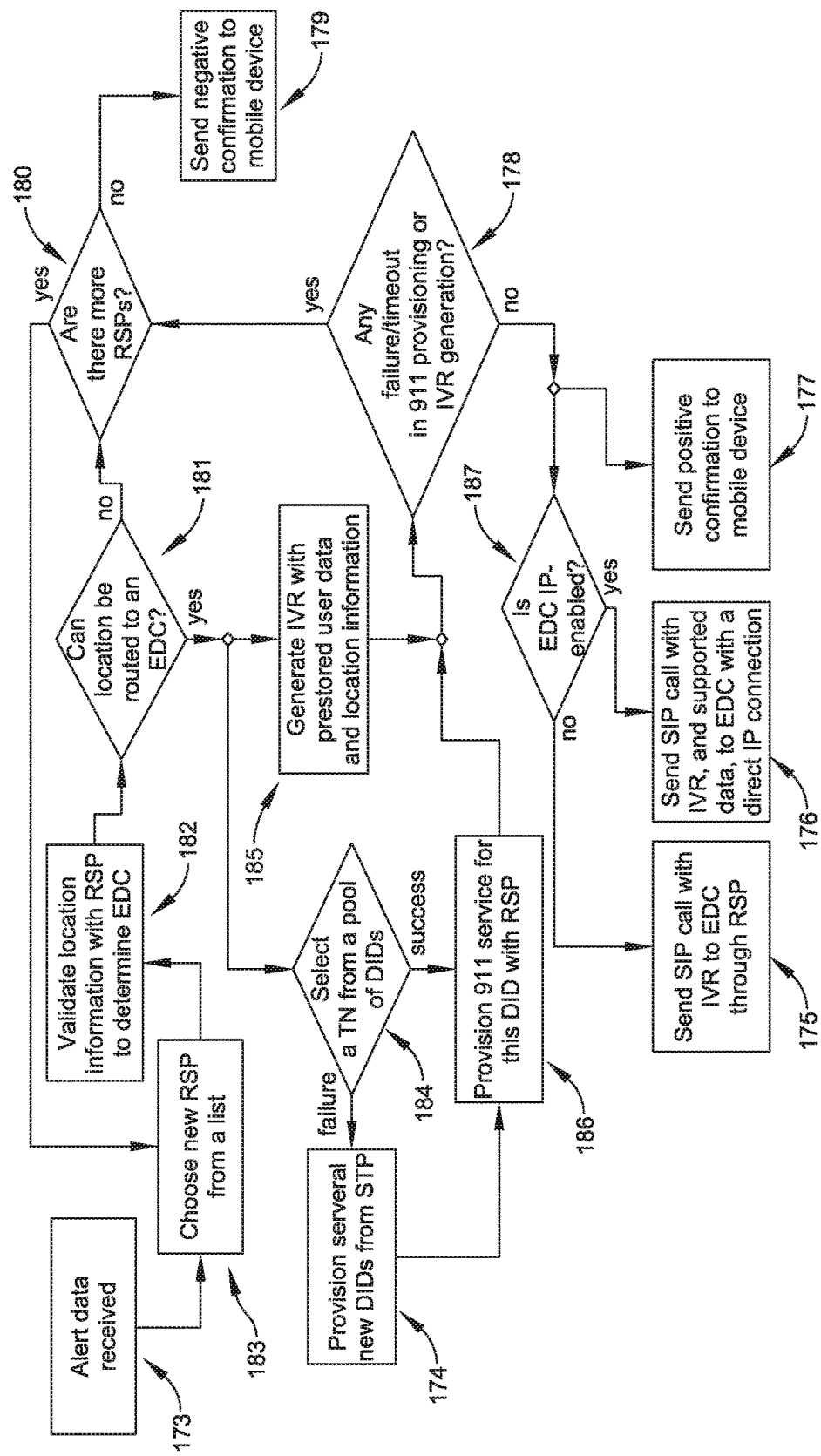
FIG. 16 is a flow chart of another embodiment of a method by which a request for emergency assistance may be communicated to an emergency dispatch center.

FIG. 16 illustrates an embodiment of a method by which the EMS 103 receives metadata from the user communication device 101 and initiates an emergency call session the emergency communication session with an EDC 105. In act 173 alert data is received at the EMS 103 from the user communication device 101. In one embodiment, location information is received from the user communication device 101, either in a request for assistance 110 or in another form of communication between EMS 103 and user communication device 101, and then generation of an IVR (act 185) and emergency service provisioning (act 186) are performed in parallel. The IVR is partially pre-created for each unique set of emergency conditions, correlated to an indication of a selection of one of a plurality of soft-buttons of the user communication device 101, that could be sent in the form of metadata from the user communication device 101, with only user location audio files created on-the-fly (audio for pre-defined user content such as user name, demographics, and other info is pre-generated at the time of user account creation). Location information about the user communication device 101 is verified with a RSP 104, selected from a list of RSPs (act 183), to locate an EDC to route the call for emergency assistance (act 182). The EMS then checks if the RSP 104 is able to find an EDC 105 in the specific location of the user communication device 101 (act 181). If the RSP 104 is able to locate an EDC 105 to which the call for emergency assistance can be routed to then the EMS 103 generates an IVR (act 185) for the user 100 to be routed to this EDC 105. In the case the RSP 104 is unable to locate a EDC 105 that services the location given by the user communication device 101, then the EMS 103 chooses another RSP from the list of RSPs (act 183) and continues to do so until the EMS 103 is able to find an RSP 104 that can locate an EDC 105 that services the location provided by the user communication device 101. In case no RSP 104 is able to find a EDC 105 to which the call for emergency assistance can be routed to in the location provided by the user communication device 101 and the EMS 103 has exhausted the list of RSPs to choose one RSP from (act 180), then the EMS 103 sends a negative confirmation to the user communication device 101 indicating that the call for emergency assistance failed (act 179). A direct inward dialing ("DID") telephone number ("TN") controlled by the system is specified as the originating call number (act 184) to facilitate callbacks from the emergency dispatch center, as described above with reference to FIG. 12. The EMS 103 maintains a pool of these resources, and assigns them to the alerts generated by the user communication device 101 by associating the DID TNs to the user communication channel and provider communication channel (act 186) as needed, leaving them associated with the alert for a certain amount of time after the two alert sessions, the first communication link from EMS 103 to user communication device 101 and the second communication link from EMS 103 to EDC 105 have been terminated. If all DID TNs in the DID DB 127 pool controlled by the EMS 103 are already assigned to an alert, the EMS 103 automatically provisions new DID TNs from a Trunking Provider ("TP") (act 174) and selects one DID TN for the current alert (act 184). After successfully provisioning the DID TN the EMS 103 sends a positive confirmation, if there are no failures in generating the IVR (acts 185, 178), to the user communication device 101 indicating that the DID TN has been provisioned (act 177). Once emergency service provisioning and IVR generation is complete (act 185), EMS 103 automatically determines if the EDC 105 is IP-enabled (act 187) before initiating a VoIP call session (act 176) using the provisioned DID TN as the callback number. If the EDC 105 is not IP-enabled, VoIP call sessions are sent to the RSP 104 for conversion to TDM 108 and routing to the EDC 105 (act 175). If the EDC 105 is IP-enabled, VoIP call sessions are sent over IP directly to the EDC 105 (act 176). In this case, any additional information that the EDC 105 can receive is also transmitted over IP using any NG911 API provided (act 176).

In the FIGS. 1-16 wherever a user communication device is shown it implies a device with a hardware memory and a central processing unit with associated I/O machine and a user interface that one can use to communicate with the central processing unit and/or access information stored in the memory of the device. Further, this device has a user interface with identifiable buttons on a touch screen, in one embodiment, where the touch of these buttons can initiate a transmission of a specific message, either predefined or defined in real-time, to the EMS or another remote device. In some embodiments, the EMS includes a collection of hardware devices, each with a at least one hardware memory and a at least one central processing unit with at least one associated I/O machine and a user interface that one can use to communicate with the at least one central processing unit and/or access information stored in the at least one memory of the device and the ability to set up communication with each other and with the user communication device and the EDC. The EMS in some embodiments contains a collection of hardware devices that, either in some or all of the devices, are connected with each other using the Internet or another form of communication link between machines that are remote from each other. In some embodiments some of the hardware devices in a collection of hardware devices contain certain software that can perform the function of a database whereas some of the hardware devices in a collection of hardware devices contain certain software that can perform the function of web servers whereas some of the hardware devices in a collection of hardware devices contain certain software that can perform the function of a PBX and whereas some of the hardware devices in a collection of hardware devices contain certain software that can perform the function of an Application Programming Interface.

Having thus described several aspects of at least one embodiment, it is to be appreciated various alterations, modifications, and improvements will readily occur to those skilled in the art. Such alterations, modifications, and improvements are intended to be part of this disclosure, and are intended to be within the spirit and scope of this disclosure. Accordingly, the foregoing description and drawings are by way of example only.

What is claimed is:

1. A method of facilitating a reliable and persistent communication between a user of a user communication device and an emergency dispatch center (EDC), the method comprising:
   receiving an emergency alert from the user communication device at an emergency management system (EMS);
   constructing an emergency message that is based on the emergency alert and that includes at least one of an audio file, an interactive voice response (IVR) message, a Short Message Service (SMS) text message, a Multimedia Messaging Service (MMS) message, an e-mail message, an Instant Messaging (IM) message, and a message otherwise formatted for communication over an Internet;
   establishing a first communication link, the first communication link including at least one of:
     a communication link between the emergency management system and the emergency dispatch center;
     a communication link between the emergency management system and a Routing Service Provider (RSP) and a communication link between the RSP and the emergency dispatch center; and
     a communication link between the emergency dispatch center and a first gateway and a communication link between the first gateway and the emergency management system;

establishing a second communication link, the second communication link including at least one of:
a communication link between the emergency management system and the user communication device; and
a communication link between the emergency management system and a second gateway and a communication link between the second gateway and the user communication device;
bridging the first communication link and the second communication link;
routing the emergency message from the emergency management system to the emergency dispatch center over the first communication link; and
actively managing the first and second communication links until a termination signal is received from the user communication device.

2. The method of claim 1, comprising communicating between the user communication device and the emergency dispatch center via one or more of text messages and e-mail exchanges.

3. The method of claim 1, wherein constructing the IVR message includes generating an audio message from alert metadata and user information of the user stored in a database of the emergency management system.

4. The method of claim 1, wherein the emergency management system sends a push notification to the user communication device notifying the user of an attempted connection with the emergency dispatch center and wherein the emergency management system sends an SMS message to the user communication device notifying the user of the attempted connection with the emergency dispatch center.

5. The method of claim 1, wherein the emergency management system continuously attempts to initiate a voice connection with the emergency dispatch center until success or termination by request by one of the user and a session controller of the emergency management system, wherein the emergency management system maintains the first communication link if the second communication link fails and maintains the second communication link if the first communication link fails and wherein the emergency management system re-establishes the first communication link in response to failure of the first communication link and re-establishes the second communication link in response to failure of the second communication link.

6. The method of claim 1, wherein the emergency management system:
determines whether a reliable data connection to the emergency dispatch center is available, and implements a VoIP session between the emergency dispatch center and the user communication device in response to a determination that a reliable data connection to the emergency dispatch center is available,
implements a cellular phone call between the emergency dispatch center and the user communication device in response to a determination that the reliable data connection to the emergency dispatch center is not available and that a reliable cellular connection between the user communication device and the emergency dispatch center is available, or
implements a PSTN phone call between the emergency dispatch center and the user communication device in response to a determination that the reliable data connection to the emergency dispatch center is not available and that the cellular phone call between the user communication device and the emergency dispatch center failed to initiate and that a PSTN telephone connection between the user communication device and the emergency dispatch center is available.

7. The method of claim 1, wherein the first communication link includes multiple TCP or UDP sessions and the second communication link includes multiple TCP or UDP sessions.

8. The method of claim 1, wherein at least one of the first gateway and the second gateway is configured to generate, transmit, receive and interpret one or more of multimedia Session Initiation Protocol (SIP) messages and H.323 signaling messages.

9. A method for providing emergency communication with an emergency management system (EMS), the method comprising:
provisioning and maintaining a pool of direct inward dial telephone numbers at one or more gateways;
receiving, at a server of the emergency management system remote from a user communication device, a transmission from the user communication device that indicates that a user of the user communication device is in an emergency;
receiving, at the emergency management system, location information metadata regarding a location of the user communication device sent from the user communication device;
using the location information metadata regarding the location of the user communication device to determine an emergency dispatch center to which to transmit an emergency message;
selecting a telephone number from the pool of direct inward dial telephone numbers;
associating the telephone number with the user communication device;
associating the telephone number with the location of the user communication device in real-time using an emergency service provisioning application programming interface (API); and
utilizing the telephone number to provision emergency service for the user from the emergency dispatch center.

10. The method of claim 9, wherein the emergency management system sends the location information metadata to one of a number of APIs exposed by third-party Routing Service Providers (RSPs) and, in response to sending the location information metadata, receives, from the one of the number of APIs, an identity of the emergency dispatch center and identifying information associated with the emergency dispatch center, including location, infrastructure capabilities, and responder availability of the emergency dispatch center, and wherein the emergency management system includes the location information metadata in a request for provisioning of emergency services for the user utilizing the telephone number, and one of the third-party RSPs updates an automatic location identification (ALI) database of the emergency management system to associate the location information metadata with the telephone number.

11. The method of claim 10, wherein the emergency management system determines if communications between the user communication device and the emergency dispatch center have been successfully established utilizing the telephone number and the one of the third-party RSPs and, responsive to communications between the user communication device and the emergency dispatch center having not been successfully established, attempts to establish communications between the user communication device and the emergency dispatch center using a different third-party RSP and associated telephone number, and wherein the emergency management system originates a telephone call to the emergency dispatch center through the one or more gateways, a PSTN landline, or a combination thereof.

12. An emergency management system (EMS) containing a communications system comprising:

at least one first input/output (I/O) system configured to receive a request for assistance from a user communication device, the request for assistance including metadata providing an indication of a location of the user communication device and a type of emergency reported by a user of the user communication device; and at least one processor in communication with the at least one first I/O system and configured to:

receive an indication of the request for assistance from the at least one first I/O system and interpret the metadata from the user communication device;

communicate with a server of the emergency management system housing a memory including personal information associated with the user via a communications network of the emergency management system, and read the personal information from the memory;

generate an emergency message related to an emergency category associated with the type of emergency reported by the user, the emergency message including information associated with the emergency category, the indication of the location of the user communication device, and the personal information associated with the user;

determine, based upon at least one of the emergency category and the location of the user communication device, an emergency dispatch center (EDC) that is equipped to receive the emergency message;

responsive to a determination that the emergency dispatch center is configured to receive non-voice calls and to a determination that the emergency message is in a non-voice format, transmit the emergency message in the non-voice format to the emergency dispatch center; and responsive to a determination that the emergency dispatch center is not configured to receive non-voice calls and to a determination that the emergency message is in a non-voice format, convert the emergency message to a voice format and transmit or play the emergency message via a non-IP communication link to the emergency dispatch center;

wherein the emergency management system is configured to create a communications bridge between the user communication device and the emergency dispatch center.

13. The system of claim 12, wherein the at least one processor is further configured to communicate the emergency message to at least one Routing Service Provider (RSP) over a communications network via at least one second I/O system of the emergency management system, and wherein the at least one RSP is configured to communicate the emergency message to a network address of the emergency dispatch center selected based on at least one of the emergency category and the location of the user communication device, wherein the emergency dispatch center is a police station, a fire house, a university-affiliated emergency dispatch center, a corporate emergency dispatch center, or a private emergency dispatch center.

14. The system of claim 12, wherein the user communication device is configured to transmit the request for assistance to the at least one first I/O system in one of text, speech-to-text, voice, and voice-to-text format, based upon a selection made by the user, and the at least one first I/O system is configured to receive and process the request for assistance in any of the text, speech-to-text, voice, and voice-to-text formats.

15. The system of claim 12, wherein the emergency management system includes an application programming interface (API) configured to create the communications bridge between the user communication device and the emergency dispatch center.

16. A user communication device comprising a portable electronic device selected from the group consisting of a smart phone, a tablet computer, a laptop computer, a mobile wireless device, and a wearable smart device and configured to request emergency assistance from an emergency management system (EMS), the user communications device comprising a user interface and at least one processor configured to:

determine a location of the user communication device;

send and receive messages over a communications network;

display a plurality of user-selectable emergency message indicators in the user interface, each of the plurality of user-selectable emergency message indicators indicative of a different type of emergency situation;

obtain an indication of the location of the user communication device;

receive an indication of a selection of one of the plurality of user-selectable emergency message indicators by a user;

responsive to receiving the indication of the selection, generate a message including the indication of the selection of one of the plurality of user-selectable emergency message indicators and the indication of the location of the user communication device;

transmit the message via the communications network to the emergency management system;

establish a communications link to an emergency dispatch center (EDC) through the emergency management system; and receive a real-time response to the message from the emergency dispatch center via the emergency management system.

17. The user communication device of claim 16, further configured to request a verification of the location of the user communication device from the user and to receive an input from the user confirming the location of the user communication device or selecting a different location, and, responsive to the user selecting the different location, include the location in the message.

18. The user communication device of claim 16, further configured to present a sub-menu of characterizations of the emergency situation, the sub-menu selected based on the selection of one of the plurality of user-selectable emergency message indicators, the sub-menu of characterizations including characterizations of the emergency situation that contain more specific information than the type of emergency situation indicated by the selection of one of the plurality of user-selectable emergency message indicators, and to include an indication of a characterization of the emergency situation selected from the sub-menu by the user in the message.

19. The user communication device of claim 16, further configured to receive additional information from the user in a form of touch, voice, gesture, an image, or a video message, and include the additional information in the message.

20. The user communication device of claim 16, configured to transmit the message over any of a plurality of communication channels, to determine a communications channel among the plurality of communication channels most suitable for the communications link, to transmit the message over the determined communications channel, and to switch the communications link from a first communications channel to a second communications channel responsive to a command from the emergency management system, wherein at least one of the plurality of communication channels includes a wireless network.

21. The user communication device of claim 16, configured to receive session status updates regarding the communications link from the emergency management system and display the session status updates in the user interface, to re-transmit the message responsive to not receiving an indication of a successful establishment of the communications link from the emergency management system, and to dial a conventional emergency response number responsive to not receiving an indication of a successful establishment of the communications link from the emergency management system after a pre-determined number of iterations of re-transmitting the message.

\* \* \* \* \*